(12) United States Patent
Coffman et al.

(10) Patent No.: US 8,375,292 B2
(45) Date of Patent: Feb. 12, 2013

(54) TOOL AND METHOD FOR MAPPING AND VIEWING AN EVENT

(75) Inventors: Daniel M. Coffman, Bethel, CT (US); Jonathan P. Munson, Putnam Valley, NY (US); Chandrasekhar Narayanaswami, Wilton, CT (US); Danny Soroker, Larchmont, NY (US); Jingtao Wang, Albany, CA (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 12/550,046

(22) Filed: Aug. 28, 2009

(65) Prior Publication Data

US 2010/0185932 A1 Jul. 22, 2010

Related U.S. Application Data

(60) Provisional application No. 61/145,392, filed on Jan. 16, 2009.

(51) Int. Cl.
G06F 17/00 (2006.01)

(52) U.S. Cl. ........................................................ 715/232

(58) Field of Classification Search .................. 715/201, 715/203, 204, 230, 232, 233, 712
See application file for complete search history.

(56) References Cited

U.S. PATENT DOCUMENTS

| | | | |
|---|---|---|---|
| 5,261,045 A | | 11/1993 | Scully et al. |
| 5,524,193 A | * | 6/1996 | Covington et al. ............ 715/210 |
| 5,568,602 A | * | 10/1996 | Callahan et al. .............. 715/203 |
| 6,054,987 A | * | 4/2000 | Richardson .................... 715/734 |
| 6,167,410 A | * | 12/2000 | Imamura ....................... 715/209 |
| 6,271,845 B1 | | 8/2001 | Richardson |
| 7,308,643 B1 | | 12/2007 | Zhu et al. |
| 7,401,087 B2 | | 7/2008 | Copperman et al. |
| 7,450,003 B2 | * | 11/2008 | Weber et al. ................ 340/539.2 |
| 7,587,685 B2 | * | 9/2009 | Wallace ........................ 715/854 |
| 7,613,731 B1 | | 11/2009 | Larson |
| 7,673,248 B2 | * | 3/2010 | Narayanaswami ........... 715/764 |
| 2002/0147645 A1 | * | 10/2002 | Alao et al. ........................ 705/14 |
| 2003/0182402 A1 | * | 9/2003 | Goodman et al. ............. 709/220 |
| 2003/0229529 A1 | * | 12/2003 | Mui et al. .......................... 705/8 |
| 2005/0102245 A1 | * | 5/2005 | Edlund et al. .................... 705/80 |
| 2006/0238538 A1 | * | 10/2006 | Kapler et al. .................. 345/440 |
| 2006/0267789 A1 | * | 11/2006 | Baldwin .................... 340/825.49 |
| 2007/0022445 A1 | * | 1/2007 | Arseneau et al. ................ 725/74 |
| 2007/0103294 A1 | | 5/2007 | Bonecutter et al. |
| 2007/0171716 A1 | * | 7/2007 | Wright et al. ............ 365/185.12 |
| 2007/0271297 A1 | | 11/2007 | Jaffe et al. |
| 2008/0010605 A1 | * | 1/2008 | Frank ............................. 715/765 |
| 2008/0024484 A1 | * | 1/2008 | Naimark ........................ 345/419 |

(Continued)

OTHER PUBLICATIONS

United States Office Action dated Sep. 23, 2011 in U.S. Appl. No. 12/550,080.

(Continued)

*Primary Examiner* — Laurie Ries
(74) *Attorney, Agent, or Firm* — William Stock, Esq.; McGinn IP Law Group, PLLC

(57) ABSTRACT

A tool for mapping an event includes a map generator for generating an event map, a view generator for generating a zoomable and pannable view of the event map, and a display device for displaying the zoomable and pannable view of the event map, and in another aspect, a tool for annotating an event map includes a map generator for generating an event map, an annotating unit for annotating the event map based on a user input, a view generator for generating a zoomable and pannable view of the annotated event map, and a display device for displaying the zoomable and pannable view of the annotated event map.

28 Claims, 23 Drawing Sheets

U.S. PATENT DOCUMENTS

| | | |
|---|---|---|
| 2008/0052372 A1* | 2/2008 | Weber et al. .................. 709/217 |
| 2008/0059889 A1* | 3/2008 | Parker et al. .................. 715/748 |
| 2008/0072145 A1 | 3/2008 | Blanchard et al. |
| 2008/0150963 A1* | 6/2008 | Stambaugh .................. 345/629 |
| 2008/0186255 A1* | 8/2008 | Cohen et al. ........................ 345/8 |
| 2008/0218531 A1* | 9/2008 | Chou et al. .................... 345/629 |
| 2008/0233927 A1 | 9/2008 | Moon et al. |
| 2008/0294678 A1 | 11/2008 | Gorman et al. |
| 2009/0006427 A1* | 1/2009 | Veeraraghavan et al. ..... 707/100 |
| 2009/0254840 A1* | 10/2009 | Churchill et al. ............. 715/753 |
| 2009/0313053 A1* | 12/2009 | Gengarella et al. ................ 705/5 |
| 2009/0319482 A1* | 12/2009 | Norlander et al. ................. 707/3 |
| 2010/0058196 A1* | 3/2010 | Krishnan et al. ............. 715/747 |
| 2010/0158315 A1 | 6/2010 | Martin |
| 2011/0022190 A1 | 1/2011 | Hegde et al. |

OTHER PUBLICATIONS

United States Office Action dated Feb. 2, 2012 in U.S. Appl. No. 12/550,080.

United States Office Action dated Aug. 10, 2012 in U.S. Appl. No. 12/550,080.

\* cited by examiner

| | | | Sunday | | | |
|---|---|---|---|---|---|---|
| 8 9 | 7 | 8 | 9 10 | 11 | 12 | |

▶ Conference Registration
▶ Breakfast
▶ Business Development Day

| | ▼ JumpStart Sessions | ▼ JumpStart Sessions |
|---|---|---|
| Swan 7-10 | Understanding Security in IBM Lotus Notes and Domino – Andrew Pollack, Gabriella Davis | Introduction to IBM LotusScript – Henry Newberry |
| Swan 1-4 | QuickStart Warp 9 – Getting Up to Speed on Social Software and IBM Lotus Connections – Ted Stanton, Gia Lyons | Overview of IBM Lotus Notes and Domino Application Development – George Langlais, Margaret Rora |
| Swan Osprey | QuickStart IBM WebSphere Portal – Sunil Hiranniah, Lauren Wendel | Web Services Bootcamp – Bill Buchan |
| Swan 5-6 | QuickStart IBM Lotus Quickr in Action – John Schumacher | All Things Mail with IBM Lotus Domino – Susan Bulloch, Paul Mooney |

540

TOOL AND METHOD FOR MAPPING AND VIEWING AN EVENT

This Application claims priority to U.S. Provisional Application No. 61/145,392 which was filed on Jan. 16, 2009 and is presently and is incorporated by reference herein.

BACKGROUND OF THE INVENTION

1. Field of the Invention

The present invention relates to a tool and method for mapping an event and more particularly, a tool and method for mapping an event which includes generating a zoomable and pannable view of an event map, and annotating an event map which may include annotating an event map based on a user input either individually or collaboratively and searching the annotated event map.

2. Description of the Related Art

When attending large multi-track events, such as conferences, trade shows or even large sporting events, attendees may be overwhelmed by the many choices available. They may find it hard to navigate the event in a way that best fits their personal interests and goals.

FIG. 1 illustrates a display screen which displays a conference schedule 100 according to a related art method. As illustrated in FIG. 1, the schedule 100 includes a session times 105 along the x-direction, and the topics for discussion 110 in those sessions along the y-direction. The schedule also includes day-of-the-week links 115 on which a user could click in order to change the day being viewed on the schedule 100.

However, such a related art method is inflexible. There is no customization of views, there is no mechanism for preconference planning, and the schedule is disconnected from any social network. In short, the conference schedule provides poor visualization and personalization for the user.

There are several types of calendaring systems currently available. For example, Lotus® Notes, Lotus® Domino and Lotus® Quickr by IBM® provide email, shared calendars, and shared document storage and management, and also provide the ability to integrate word processing applications. There are also known in the related art several Web-based mashup creators (e.g., Web Summary, Marmite, and d.mix) which may allow a user to browse annotated web sites and perform a parametric copy of elements of interest.

There are also known in the related art, smart scheduling systems (e.g., GroupTime and RhaiCAL) and zoomable calendar interfaces (e.g., DateLens and Spiral Calendar) and zoomable interfaces (e.g., Planviewer) for visualizing hierarchical temporal data such as Microsoft® Project plans.

Timeline is another application that allows for visualizing time-based events. Timeline is a DHTML-based AJAX mashup/widget which supports horizontal panning and allows a user to overlay annotations on top of a timeline. There are also other applications which may allow a user to visualize time-oriented data and hierarchical data (e.g., DOI Tree AVI and Polyarchies). There have also been some standards which have been published related to personal information exchange (e.g., vCard) and calendaring and scheduling (e.g., VCalendar and RDF Calendar).

There are also other related art systems and methods which relate to personal information exchange, calendaring and scheduling (e.g., Google Calendar, Trumba® Connect, Achieve Planner, Zimbra™ Calendar, The Calendar Planner, 30Boxes, Calendarhub, diigo, AirSet, Spongecell, HipCal, nTreePoint Events, Cozicentral, iCalShare and Calgoo).

However, none of these related art systems and methods provides a user with a zoomable and pannable view of a customized event map.

In addition, when attending large multi-track events, such as conferences, trade shows or even large sporting events, attendees may be overwhelmed by the many choices available. They may find it hard to navigate the event in a way that best fits their personal interests and goals. However, none of these related art systems and methods may include annotating an event map based on a user input either individually or collaboratively and searching the annotated event map.

SUMMARY OF THE INVENTION

In view of the foregoing and other problems, disadvantages, and drawbacks of the aforementioned conventional systems and methods, an exemplary aspect of the present invention is directed to a tool and method of mapping an event, and a tool and method for annotating an event map which may include annotating an event map based on a user input either individually or collaboratively and searching the annotated event map.

An exemplary aspect of the present invention is directed to a tool for mapping an event includes a map generator for generating an event map, a view generator for generating a zoomable and pannable view (e.g., a customized view) of the event map, and a display device for displaying the zoomable and pannable view of the event map.

Another exemplary aspect of the present invention is directed to a method of mapping an event. The method includes generating an event map, generating a zoomable and pannable view of the event map, and displaying the zoomable and pannable view of the event map.

Another exemplary aspect of the present invention is directed to a tool for mapping an event, including a map generator for generating an event map, a customizing unit for customizing a view of the event map in a context comprising one of time, location, user and activity, based on user data, a view generator for generating the customized view of the event map, the customized view comprising a zoomable, pannable and mashable view of the event map, and including one of a timeline view, a branch view and a planogram view, and a display device for displaying the zoomable, pannable and mashable view of the customized event map, The view may include a link related to a feature in the customized event map, and the view generator generates a view (e.g., a view of a pdf file, photo, video, etc.) in response to a user selection of the link, the feature including one of an event location, an event rating, an event time, an event session, and media (e.g., a paper) or other presentation, information or media associated with an event session. Further, customizing the view of the event map may include one of: customizing the view of the event map before the event, such that the customized view of the event map includes an identifier for identifying at least one of a session that has been marked as being of interest, a conflict among plural sessions that have been marked as being of interest, a location in a planogram of a session that has been marked as being of interest, and a location in a planogram of a structure housing an attendee of the event, and customizing the view of the event map during the event, such that the customized view of the event map includes an up-to-date view of the event map. The up-to-date view may, for example, highlight at least one of a session being attended by a user, and a session being attended by a person other than the user.

Another exemplary aspect of the present invention is directed to a system for mapping an event. The system includes an event server for storing event data, a processing device for inputting user data, the processing device being connected to the event server via a network, a tool for mapping an event, the tool being connected to the event server and the processing device via the network. The tool includes a map generator for generating an event map based on the event data, a view generator for generating a zoomable and pannable view of the event map, and a display device for displaying the zoomable and pannable view of the event map.

Another exemplary aspect of the present invention is directed to a tool for annotating an event map. The tool includes a map generator for generating an event map, an annotating unit for annotating the event map based on a user input, a view generator for generating a zoomable and pannable view of the annotated event map, and a display device for displaying the zoomable and pannable view of the annotated event map.

Another exemplary aspect of the present invention is directed to a method of annotating an event map. The method includes generating an event map, annotating the event map based on a user input, generating a zoomable and pannable view of the annotated event map, and displaying the zoomable and pannable view of the annotated event map.

Another exemplary aspect of the present invention is directed to a tool for annotating an event map. The tool includes a map generator for generating an event map, and an annotating unit for annotating the event map based on a user input, the annotating including tagging information (e.g., a comment) onto a feature of the customized hierarchical event map, the feature including one of a session of an event, a paper to be presented at the event, media elements related to the event, a speaker at a session of the event, and a location related to the event. The tool also includes a view generator for generating a zoomable and pannable view of the annotated event map, a customizing tool for customizing a view of the annotated event map based on customizing data, a display device for displaying the zoomable view of the annotated customized hierarchical event map, a graphical user interface (GUI) which is displayed by the display device, and includes a viewing panel for displaying the zoomable view of the annotated hierarchical event map, a storage device for storing the annotated hierarchical event map, a search unit for performing a search of the hierarchical event map based on search criteria input to the search unit by a user; and a sharing unit for setting a policy for sharing the annotated hierarchical event map.

The sharing unit may be used, for example, to designate an annotation in the annotated event map one of public, private and shared with a group (e.g., one or more persons or entities) that is definable or configurable by the user. For example, the user may use the sharing unit to configure the group to include the employees of a particular company, members of a particular organization, people meeting particular criteria, etc.

The "search criteria" may include keywords, topics, authors, organizers, locations, annotations, etc. A user may input such search criteria to search for event maps that have been annotated in a particular manner. For example, the search criteria may also be input to search for an event map that has been annotated by a specific user, by one among a group of users, by a person of certain amount of repute, by a certain number of users, during a specific time interval, with particular terms, with specific hyperlinks, and with a range of ratings.

Another exemplary aspect of the present invention is directed to a system for collaboration among event attendees. This could come in the form of being able to interact with people who are attending the same session or with people attending different sessions in the event. A user may attend the event in person or by other means such as internet enabled meetings, video conferences and so on. A user may access these capabilities (e.g., the event, meetings, or conferences) on a variety of devices such as laptop computers, netbooks, cell phones, ebooks, desktop computers, etc.

Another exemplary aspect of the present invention is directed to a system for annotating an event map. The system includes an event server for storing event data, a processing device for inputting user data, the processing device being connected to the event server via a network, a tool for annotating an event map, the tool being connected to the event server and the processing device via the network, and including a map generator for generating an event map, an annotating unit for annotating the event map based on a user input, a view generator for generating a zoomable and pannable view of the annotated event map, and a display device for displaying the zoomable and pannable view of the annotated event map.

The present invention also includes a programmable storage medium tangibly embodying a program of machine-readable instructions executable by a digital processing apparatus to perform the inventive method.

The invention may also include a computing infrastructure in which computer-readable code is integrated into a computing system, such that the code and the computing system combine to perform the method of mapping an event or the method of annotating an event map according to the present invention.

With its unique and novel features, the present invention provides a tool and method for mapping an event which is more efficient and convenient than conventional systems and methods, and an efficient and convenient tool and method of annotating an event map which may include annotating an event map based on a user input either individually or collaboratively and searching the annotated event map.

BRIEF DESCRIPTION OF THE DRAWINGS

The foregoing and other objects, aspects and advantages will be better understood from the following detailed description of the embodiments of the invention with reference to the drawings, in which:

FIGS. 5A-5D illustrates timeline views 510-540 which may be generated by the tool 200, in accordance with an exemplary aspect of the present invention;

DETAILED DESCRIPTION OF THE EMBODIMENTS OF THE INVENTION

Figure 1:
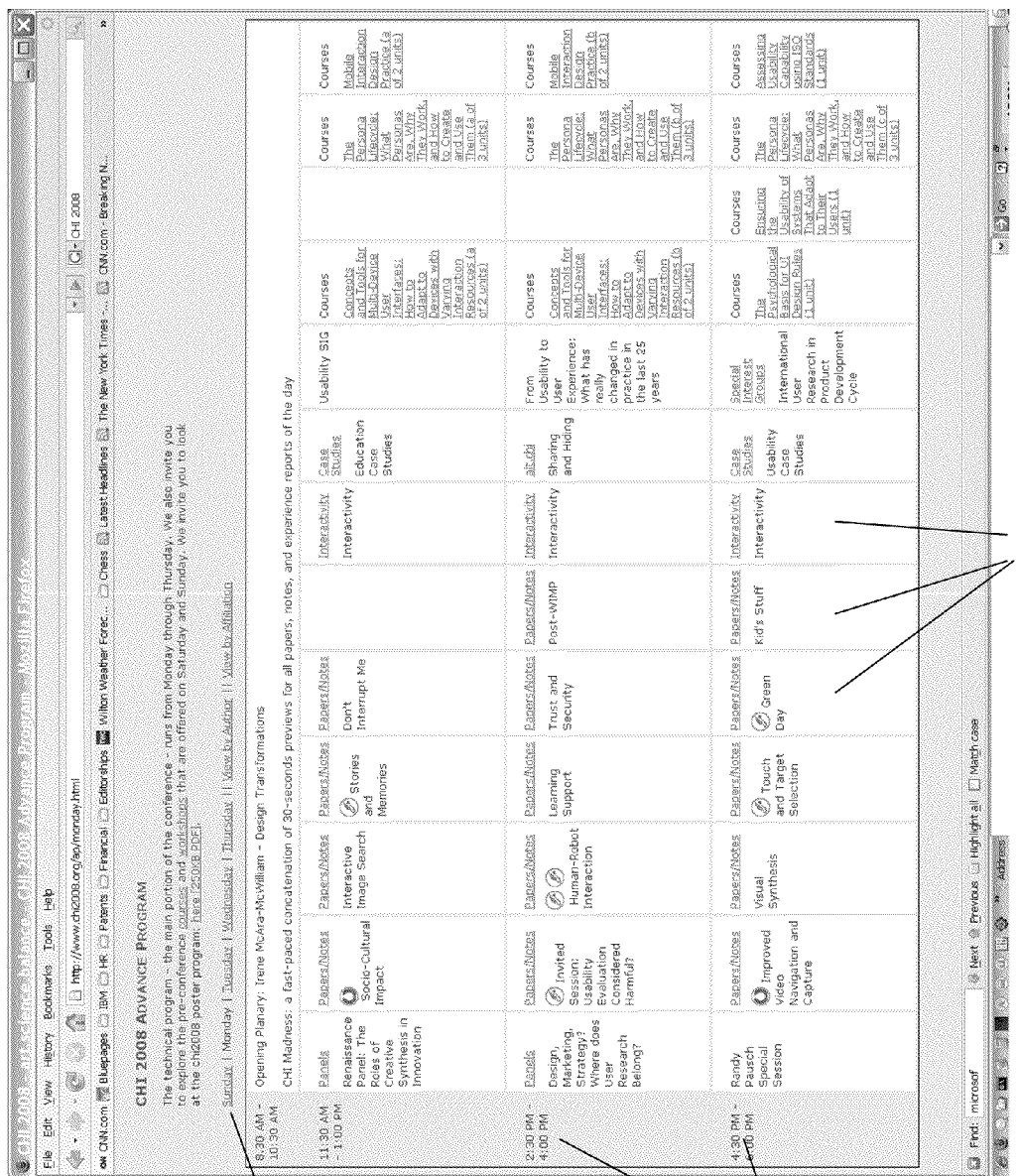
FIG. 1 illustrates a display screen which displays a conference schedule 100 according to a related art method.

Referring now to the drawings, FIGS. 2-11 illustrate the exemplary aspects of the present invention.

It should be noted that the term "mashup" may be construed to mean an application (e.g., Web application) that combines data from more than one source (e.g., from plural content providers) into a single integrated tool (e.g., tool 200). For example, a mashup may receive different forms of media from plural sources and combine the different forms of media into a single graphical interface (e.g., an event map). The term "mashable" may be used to describe an application that is capable of combining data from more than one source into a single integrated tool.

The present invention may include a Web-based collaborative calendar that provides a mashup substrate that can host both text and media (e.g., still image and moving image, audio) data. The invention may also provide a zoomable and pannable (e.g., and mashable) interface, and generate a hierarchical event composition.

A zoomable interface allows a user to view the contents at different levels of detail or resolution. A zoom can be literal or in image space where the contents are magnified and shown with a higher drawing resolution as would be done with a magnifying lens or, semantic or in model space, where a different level of information is shown when the user zooms in. An example of literal zooming occurs when a user zooms in on a photo from a digital camera. An example of semantic zoom occurs when additional information is rendered such as including an abstract of a talk when the user zooms in instead of just the title for the talk.

A pannable interface allows a user to examine parts of the data that are not presently viewable in the viewing region or window by bringing such portions of data into the viewing region or window. Panning can include horizontal panning, vertical panning or panning in other directions such as a northwesterly direction or a southwesterly direction, etc. In particular, the invention may provide a customizable view based on time, content and/or keywords. The invention may also allow a user to collaborate with co-workers and colleagues, and may associate an event with location and planogram data in order to improve the visualization for the user.

The invention may provide an application programming interface (API) which allows overlays, manipulation, data composition, and personalization on a substrate of an event map (e.g., event schedule, event calendar, etc.). The invention may also allow a user to correlate data across events, across features within sub-events, etc.

The event map may include, for example, an interactive representation of an event. The whole event may be represented in a standard format, such as extensible markup language (XML), which may allow rendering of the event in a substrate that can be zoomed and panned. A slot in the event may include people such as speakers, organizers, and attendees (which may be represented in a vCard-like format), a subject (papers, presentations, etc) and/or other information (e.g., sessions and session hierarchies) which may be represented in a vCalendar-like format. The invention may also generate a planogram view of the event location.

Figure 2A:
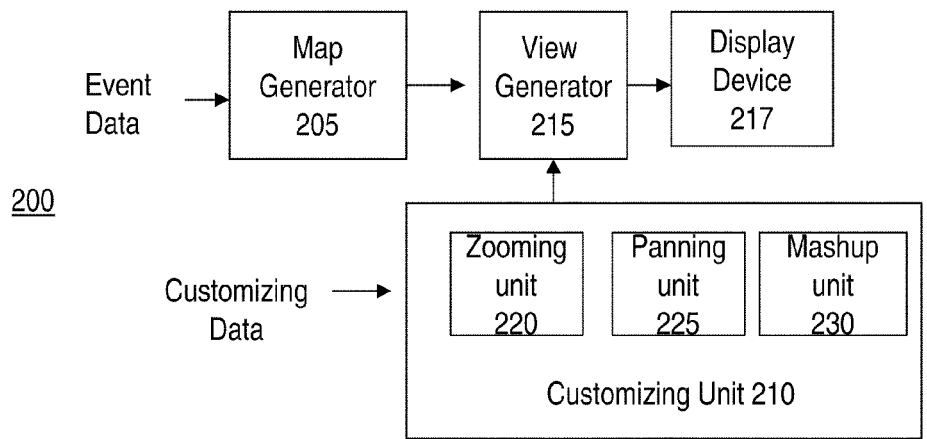
FIGS. 2A-2B illustrates a tool 200 for mapping an event and a system 250 for mapping an event, respectively, in accordance with an exemplary aspect of the present invention.

FIG. 2A illustrates a tool 200 for mapping an event, according to an exemplary aspect of the present invention. The tool 200 includes a map generator 205 for generating an event map (e.g., a hierarchical event map), a view generator 215 (e.g., a rendering engine) for generating a zoomable and pannable view of the event map, and a display device 217 for displaying the zoomable and pannable view of the event map. The map generator 205 may consume data pertaining to the event and build an internal representation that is suitable for further processing and rendering.

The tool 200 may also include a customizing unit 210 for customizing a view of the event map. For example, customizing data (e.g., user data pertaining to a user, attendance data pertaining to an attendee of the event, data pertaining to the event, and/or data pertaining to a portion of the event) may be input to the customizing unit 210 (e.g., using an input device such as a keyboard) and the view of the event map may be customized based on this customizing data, so that the view generator outputs a "customized view" for display on the display device.

The attendance data may include, for example, attendance data for the user and/or attendance data a person other than the user. For example, the attendance data may include data indicating that the user is attending Track 1 of the morning session and Track 3 of the afternoon session of a conference. Thus, for example, the event map may include an event map that has been customized to reflect the sessions which the user and/or a person other than the user is attending, plans to attend or has attended.

Further, the user may mark the sessions that he plans to attend and provide this data to the event map for further utilization. For example, the event map can use the data input by the user to determine (e.g., and display) the number of people who are planning to attend a session, how full a session is compared to the physical or virtual capacity allocated to that session, etc.

It should be noted that although FIG. 2 shows the customizing data as being input to the customizing unit 210, the customizing data might also be input to the event map view generator 205.

More specifically, the tool 200 may represent an event as a data object that may be stored in a file. The data object may also be stored in a database with well-defined schemas and tables. The view generator 215 may interpret the data object and create a rendering (e.g., a customized view of the event map). The view may include one or more links which may point to a file (e.g., a pdf file, photo (e.g., JPEG file), video (e.g., MPEG file) etc.), or may point to a feature other than a file (e.g., selecting the link may open a popup window, launch an overlay, cause auxiliary information to be displayed, etc.).

The customizing unit 210 may include a zooming unit 220 for causing the view generator 215 to generate a zoomed view of a feature of an event map, a panning unit 225 for causing the view generator 215 to generate a panned view of an event map, and a mashup unit 230 which may generate a mashup substrate that may access data (e.g., third party data) using an application programming interface (API), and cause the view generator 215 to generate a view of an event map which represents the mashup. The zooming, panning and mashup units 220, 225, 230 of the customizing unit 210 may be controlled, for example, by a user input.

A "feature" of the event map may include information such as charts, presentations, media (e.g., papers such as Word files, Excel files, pdf files, etc.), flash files, 3D animation, audio podcasts (e.g., MP3 files), still image files (e.g., JPEG files) and video images (e.g., MPEG files)) and user-definable information. For example, if the event map is for a sporting event, a feature of the event map may include player statistics, video highlights of games and players, audio snippets of games or interviews of players and coaches, and so on.

Figure 2B:
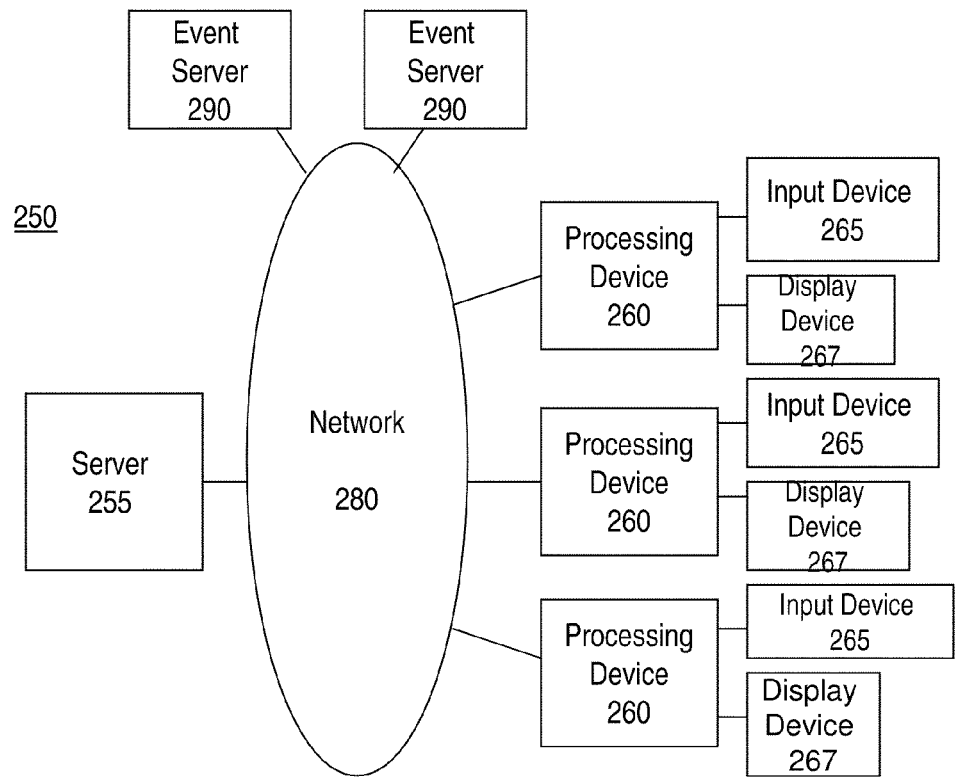

The tool 200 may be implemented partially or completely in either hardware or software or a combination of both. For example, the tool 200 may include an event mapping software program of machine-readable instructions executable by a digital processing apparatus to perform a method of mapping an event. FIG. 2B illustrates a system 250 for mapping an event according to an exemplary aspect of the present invention. As illustrated in FIG. 2B, the system 250 may include a server 255 which may include a memory device (e.g., hard drive, RAM, CD-ROM, etc.) which may store the tool 200. The system 250 may also include plural processing devices 260 (e.g., an electronic device such as a camera, mobile phone, desktop computer, tablet computer, laptop computer, handheld device, personal digital assistant (PDA), Blackberry device, etc.) which may include a memory device (e.g., hard drive, RAM, CD-ROM, etc.) for storing the tool 200.

The processing device 260 may be connected (e.g., via wired or wireless communication link) to the server 255 via a network 280 (e.g., the Internet). A user may use an input device 265 (e.g., keyboard, mouse, touch panel, joystick, microphone, flexible deformable panels, camera coupled with computer vision algorithms, etc.) which is connected to the processing device 260 in order to input customizing data to customize a view of an event map, and to view or manipulate data displayed in the customized event map on the display device 267.

The system 250 may also include one or more event servers 290 which may store event data relating to an event such as a conference, convention, tradeshow or sporting event. For example, such event data may include the topics for discussion by day, time, session (e.g., morning, afternoon and evening session), details for individual event items such as titles, presenters, their affiliations, and presentation media such as charts, live or recorded videos, and live or recorded podcasts, the location of sessions, and planogram data that may additionally include pictures, seating arrangements, and details about the location such as acoustic properties, the type of audiovisual equipment in the room.

It should be clear that additional information related to the event could vary depending on the type of the event, a sporting event would have different data compared to an academic conference. For example, the server 290 may store the event data in the form of a list or a table, and the tool 200 (e.g., stored on either the server 255 or a user's processing device 260) can access that event data and use the accessed event data to generate an event map (e.g., in the event map generator 205) a view of which may be customized by the user using the processing device 260.

The customized view of the event map may be displayed in a display screen of the display device 267 in response to a user input. In particular, the memory device of the processing device 260 may store a browser (e.g., a Web browser such as Internet Explorer) for viewing the customized view of the event map.

Figure 3A:
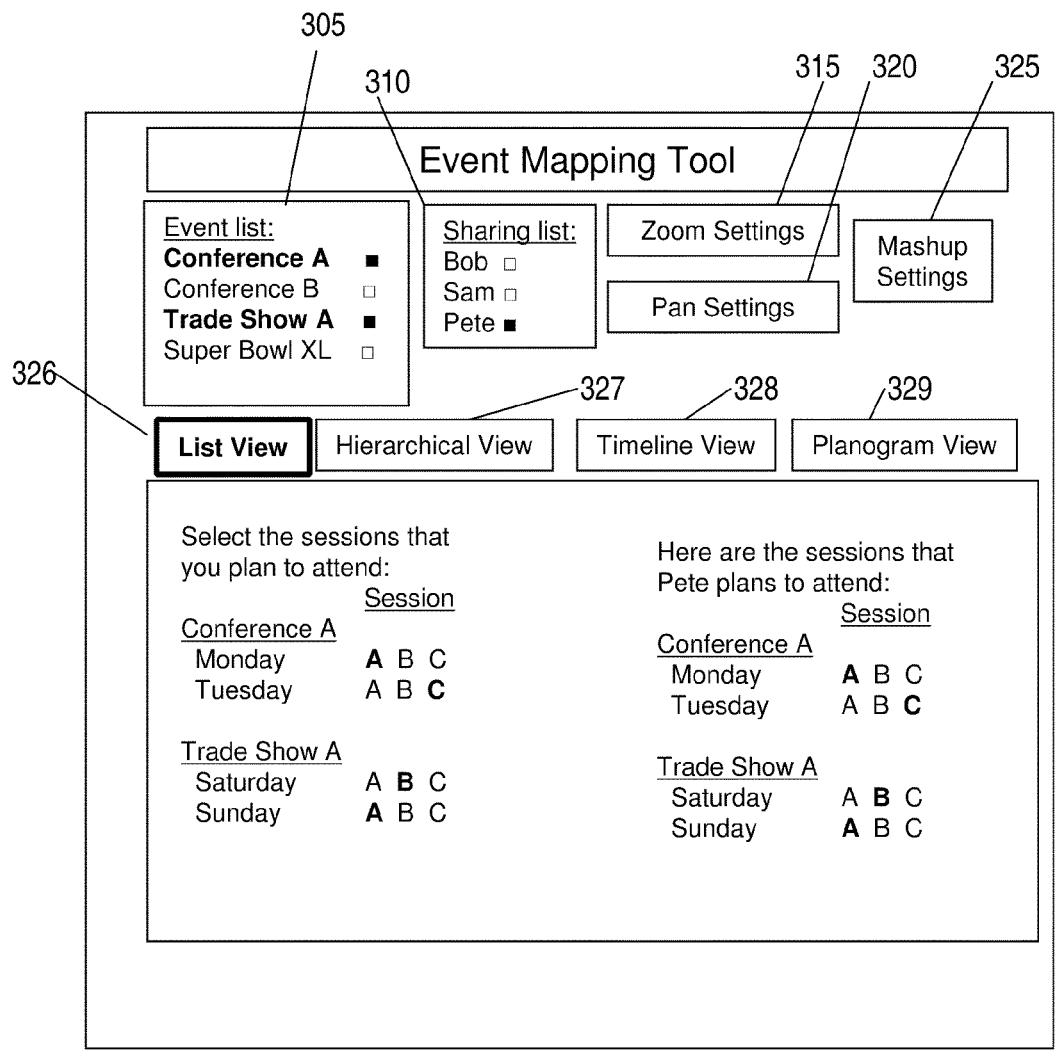
FIGS. 3A-3B illustrate a graphical user interface (GUI) 300 which may be generated by the tool 200 for mapping an event, in accordance with an exemplary aspect of the present invention.

FIG. 3A illustrates a graphical user interface (GUI) 300 which may be generated by the tool 200 and displayed on the display device 267, according to an exemplary aspect of the present invention. The GUI 300 may include an event list 305 which lists the events which the user has selected and may attend, and a sharing list 310 which lists the people (e.g., groups of people such as family, organizations, co-workers, colleagues) which the user has selected. The GUI 300 may also include a button which may be selected in order to add events to the event list 305 and to add people to the sharing list 310. The GUI 300 may allow the user to set permissions and sharing lists.

The GUI 300 may also include a Zoom Settings button 315, Pan Settings button 320, and mashup Settings button 321 which may be selected by the user in order to set the zoom, pan and mashup features of the tool 200, respectively. The zoom and pan functions may be performed directly with input devices 265. Touch screen actions such as swipes, pinches, etc., can be used. A stylus may also be used for control. The amount of flexion on a flexible display can also be used as an input mechanism to control the zoom and pan functions. The GUI 300 also includes a viewing panel 325 for viewing the event map, and a list view button 326, branch view button 327, timeline view button 328 and a planogram view button 329 which may be selected by the user in order to display either a list, branch, timeline or planogram view of the event map in the viewing panel 325.

Figure 3B:
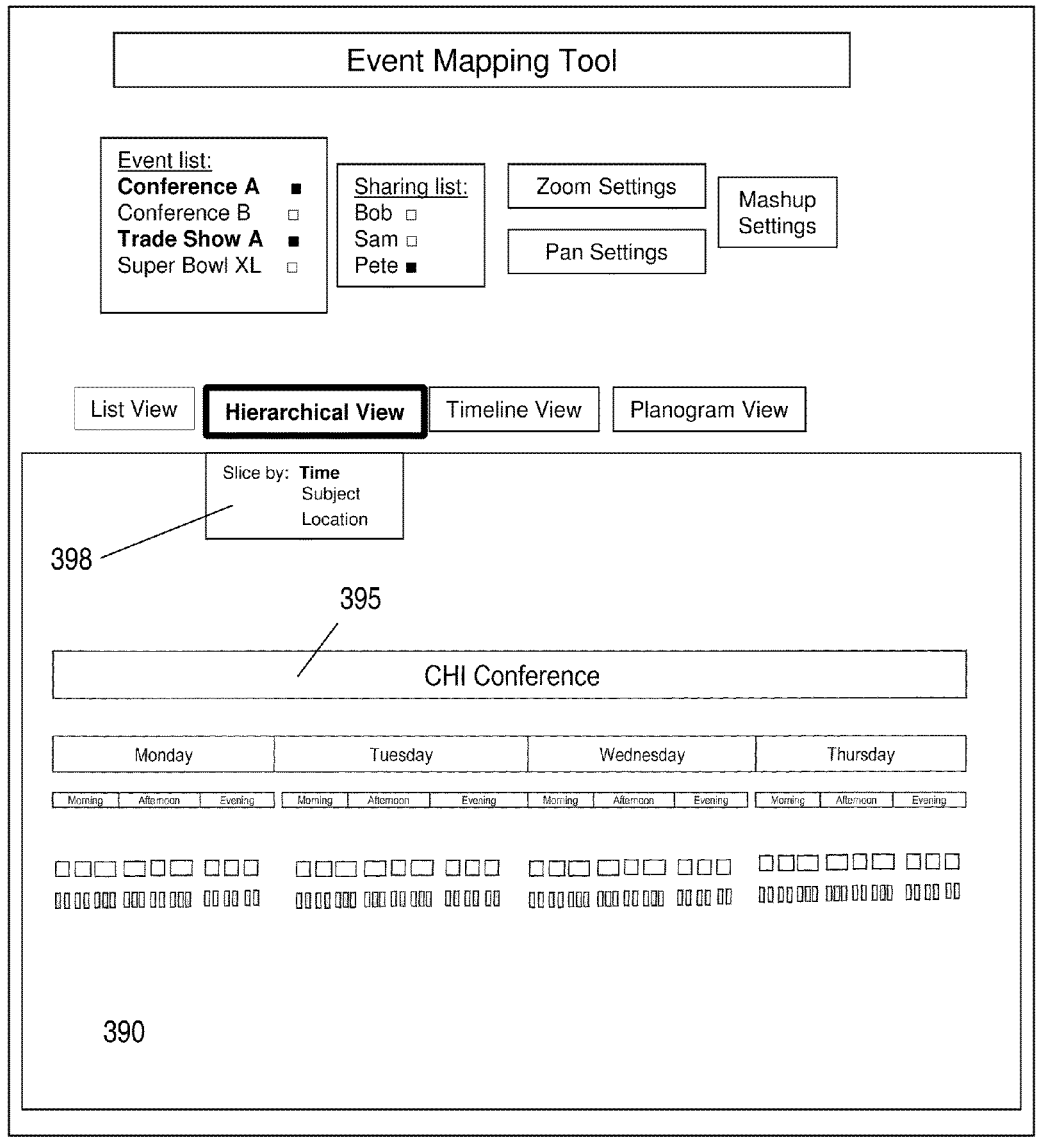

FIG. 3B illustrates an example of the GUI 300 in which the user has selected the branch view to be displayed in the viewing panel 325, according to an exemplary aspect of the present invention. As illustrated in FIG. 3B, the view of the event map which is displayed in the viewing panel 325 may be provided on a substrate that is zoomable, pannable and mashable. That is, the mashable substrate can be panned left and right or in other directions such as top to bottom, zoomed into and out of and configured based on a user input.

The tool 200 may address common issues that arise while attending an event such as a large multi-track event. The tool 200 may help the user to keep track of what segments (e.g., sessions, tracks, etc.) of the event to attend, and to plan out a personalized schedule. The tool 200 may represent the conference calendar in a pannable, zoomable and mashable substrate, in a manner which includes a variety of visualization and collaboration elements on the event substrate.

The tool 200 may represent events with vCal/XML structures and may represent people with vCard/XML structures, so that customization, searching and/or filtering with the tool 200 is all in scope.

Further, a sub-event of the event (e.g., Papers Session of Track 1 on Monday morning) can have a name-space and a repository containing files (e.g., a PDF file, MS Word file, Excel file, JPEG file, Flash file, video file, 3D animation file, etc.) and other features relating to the sub-event. For example, if a user clicks on the paper session 390 in FIG. 3B, the tool 200 may access PDF files of all of the papers to presented in a session on Monday morning at the conference, and cause a PDF viewer application (e.g., Adobe Acrobat) to be opened up and display the PDF files from the Monday morning session on the display device 267.

The tool 200 may provide a more dynamic viewing of complex events with steady and pleasing zooming and panning for multi-track events. Also, sub-events may be structured as smaller "EventMaplets" which may subsequently be shared between users.

Further, instead of splitting the large amount of information into "a deck of cards" to fit into a user's browser screen, the tool may leverage spatial cues to visualize events (e.g., temporally related events). The tool 200 may also provide a customizable hierarchical layout of events via multiple constraints defined by contexts such as time, location, user and activity.

In addition, the user may use the tool 200 to customize a view of the event map before, during and/or after the event. For example, the tool 200 may provide a "MyConference" page, which may have features that are similar to other pages such as MyYahoo or iGoogle pages.

For example, the MyConference page may show only sessions that the user has selected for inclusion in his personal conference schedule. The user can use several means to make such a selection including, for example, restricting the times to only certain hours in the day, restricting the subject matter to only certain topics, restricting the presentations to certain presenters or affiliations of presenters, etc.

First, before the event actually begins, the tool 200 may display (e.g., in the GUI 300) for the user the sessions that he has marked as being of interest. For example, in FIG. 3B, the sessions which the user plans to attend may be indicated by an indicator (e.g., highlighted, color coded or design coded) for distinguishing these sessions from other sessions which the user does not plan to attend. This may allow the user to visualize a conflict among those items of interests, such as when two events occur in different places at the same time.

The tool 200 may also indicate sessions that a person other than the user (e.g., the user's friends, co-workers, etc.) will attend. For example, in FIG. 3B, the sessions which the user plans to attend may be colored red, and the sessions which his friend, Pete, plans to attend may be colored blue. The tool 200 may also show room location on the conference site planogram, pictures of the room, seating arrangements, details about the audiovisual and other equipment in the room, the location of the sessions which the user and his friends plan to attend, the location of the hotel where the user or the user's friends are staying, etc. Users may also be able to reserve their seats for a session by connecting to a self contained or external reservation system. Such details can be revealed in an auxiliary window or as overlay.

Second, the tool 200 may continuously or periodically update the event map before and/or during the event. In particular, during the event, the tool 200 may keep the event map up-to-date in order to show the session which the user is currently attending, the session which the user's friends are currently attending, indicate any cancellations or changes in sessions, such as a change in location or a change in lecturer, indicate any changes to the sessions which the user or the user's friends plan to attend, etc. For example, during the event, the user may access the tool 200 using his laptop computer or his PDA (e.g., Blackberry) using the WiFi access of the location (e.g., hotel, convention center) or other forms of wireless connectivity such as 3G or 4G cellular. Thus, by viewing the updated event map, a group of co-workers may ensure that they are attending different sessions of the event in order to ensure that the group is optimizing the information that they are acquiring from the event.

The event map may also provide the user (e.g., the members of the group) with the sense that he is attending several sessions (e.g., all of the sessions) simultaneously. For example, viewing the event map in FIG. 3B, the user may realize that his friend Pete is in a session in which Professor X is lecturing. If the user has a question for Prof. X, the user can simply open an instant messaging dialogue box on his browser and send an instant message to Pete and ask Pete to ask the question of Professor X.

Moreover, the user could click on a link for another track which he is not attending in order to receive live audio feed of the other track which may be output from the user's processing device (e.g., laptop, PDA, etc.), or video feed of the other track which may be displayed in the viewing panel 325 of the GUI 300 on his display device 209. Alternatively, the discussion at each of the sessions may be transcribed (e.g., transcribed in real time) so that a user could be attending Track 1 session on Monday Morning, while viewing (e.g., in the viewing panel 325 of the GUI 300) the transcribed discussion of the Track 2 session, and so forth.

The tool 200 may also include in the GUI 325 a mechanism for allowing the user to direct a question to the lecturer of a session which is different from the one that the user is attending. For example, while a user is attending Track 1 session on Monday Morning, he could direct a question (e.g., via instant messaging, etc.) to the lecturer of the Track 2 session, and so forth.

Further, if a conference session is being videotaped, the conference organizer may make the video of the session available to the conference attendees in real time via a wired or wireless communication link, and store past sessions (e.g., on the event server 260). In this case, the GUI 300 may include a list of all of the sessions so that the user could select a session from the list in order to view the video (e.g., streaming video from the conference website) which may be displayed in the viewing panel 325 of the GUI 300.

Referring again to the drawings, FIGS. 4A-4H illustrate exemplary views 410-480 which may be generated by the view generator 215 of the present invention.

Figure 4A:
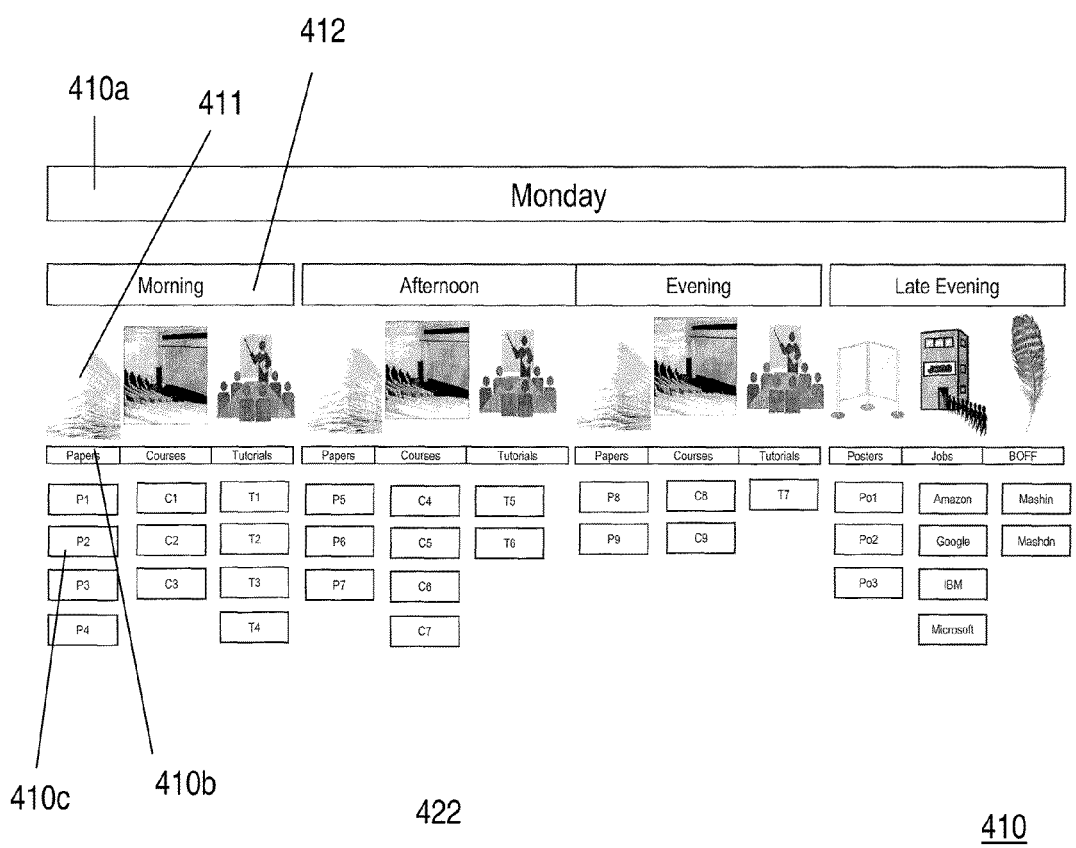
FIGS. 4A-4H illustrate branch views 410-470 which may be generated by the tool 200, in accordance with an exemplary aspect of the present invention.

For example, FIG. 4A illustrates a day view 410 which highlights a day (e.g., Monday) of the event. The day view 410 for Monday may be generated by the tool 200 and displayed in the viewing panel 325 by zooming into (e.g., clicking on) the Monday button on the overview event map in FIG. 3B. The day view 410 may provide a more detailed view of Monday's sessions by breaking Monday down into first subcolumns 410a for Morning, Afternoon, Evening and Late Evening, second subcolumns 410b for papers, courses and tutorials, and third subcolumns 410c for the individual papers, courses and tutorials. The day view 410 may also include icons and images 411 to improve the labeling and visualization for the user.

Figure 4B:
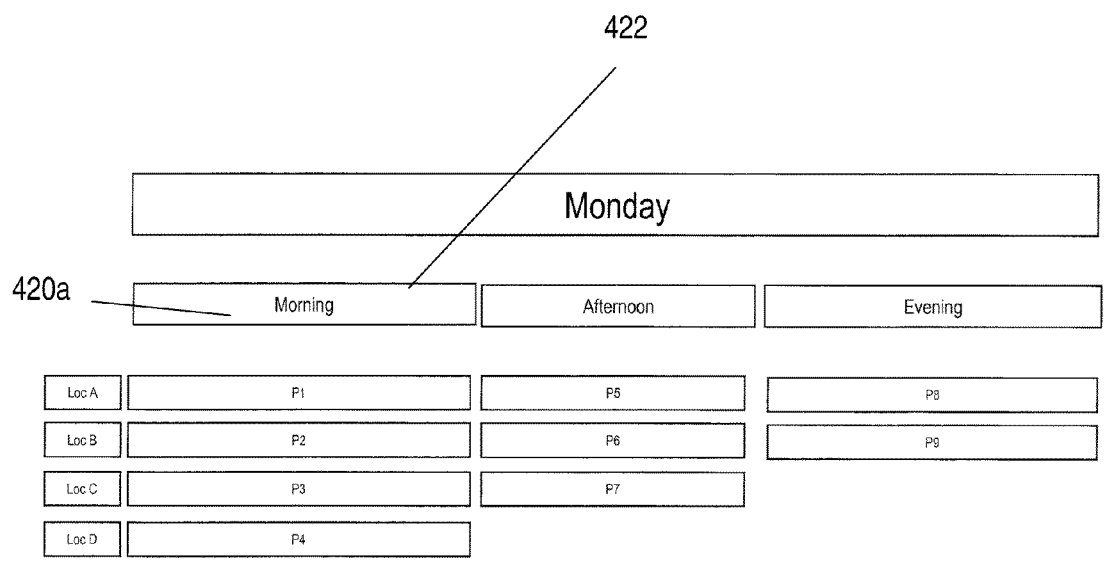

FIG. 4B illustrates a paper session view 420 which may be generated by the tool 200 and displayed in the viewing panel 325 by zooming into (e.g., clicking on) the Papers button 412 in the day view 410 in FIG. 4A. The paper session view 420 highlights the paper sessions of the event on Monday. The view 420 breaks Monday down into columns 420a for Morning, Afternoon and Evening, and displays the papers being presented at locations A, B, C and D for each of those columns (e.g., assuming that there are parallel sessions conducted concurrently in different rooms at the event). As illustrated in FIG. 4B, the tool 200 is configurable by the user, and provides the user with more information (e.g., increasing detail) about an aspect of the event as the user zooms into that aspect. Other detailed information such as the amount of space available in a session or the number of people attending a session may also be displayed. Such details can in some instances be revealed in an auxiliary window or as overlay.

Figure 4C:
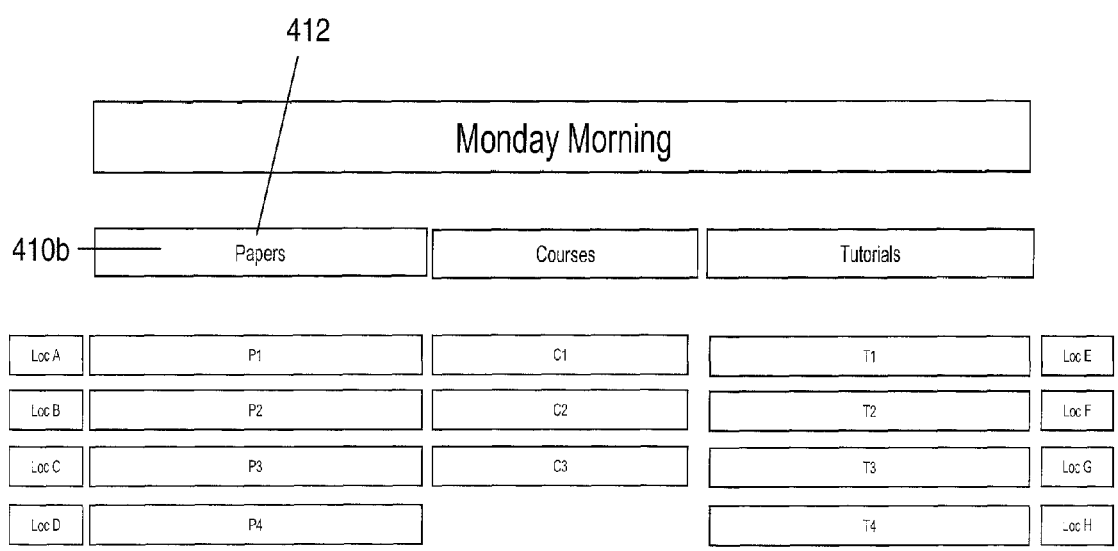

FIG. 4C illustrates a Monday morning view 430 which may be generated by the tool 200 and displayed in the viewing panel 325 by zooming into (e.g., clicking on) the Monday morning button 422 in the paper session view 420 in FIG. 4B, or by zooming into (e.g., clicking on) the Monday morning button 422 in the day view 410 in FIG. 4A. Similar to the day view 410 in FIG. 4A, the Monday morning view 430 displays columns 410b for papers, courses and tutorials for Monday morning. However, the Monday morning view 430 also displays the locations (e.g., Location A-H) where the papers, courses and tutorials sessions are being held.

Figure 4D:
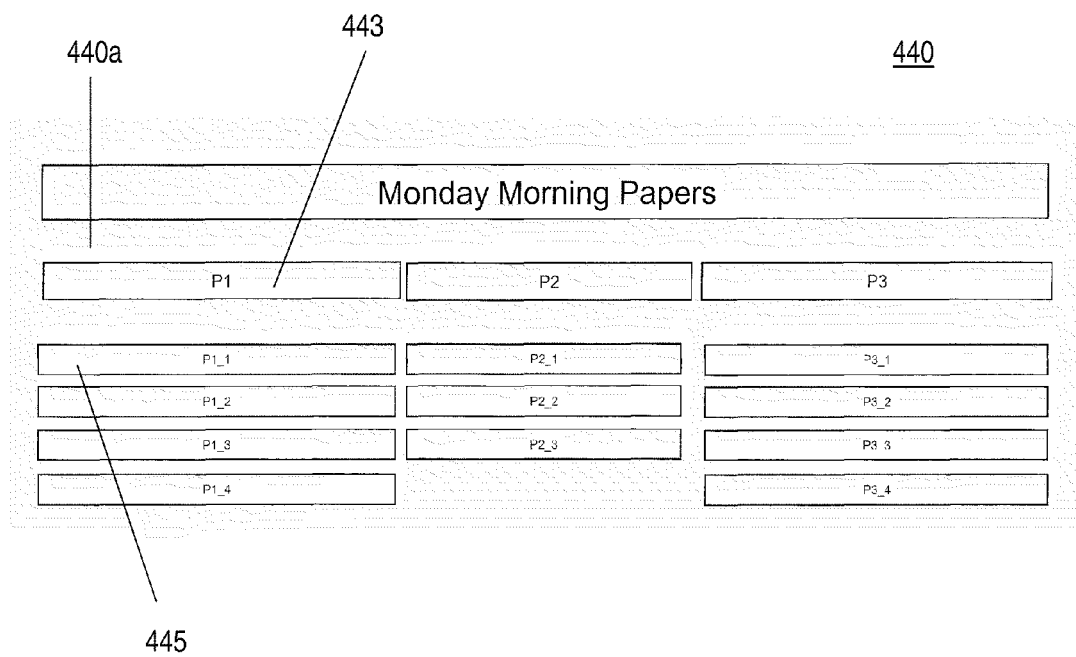

FIG. 4D illustrates a Monday morning papers view 440 which may be generated by the tool 200 and displayed in the viewing panel 325 by zooming into (e.g., clicking on) the Papers button 412 in the Monday morning view 430 in FIG. 4C, or by zooming into (e.g., clicking on) the Papers button 412 in the day view 410 in FIG. 4A. The Monday morning papers view 440 displays three columns 440a which include three categories (P1, P2 and P3) of papers.

Figure 4E:
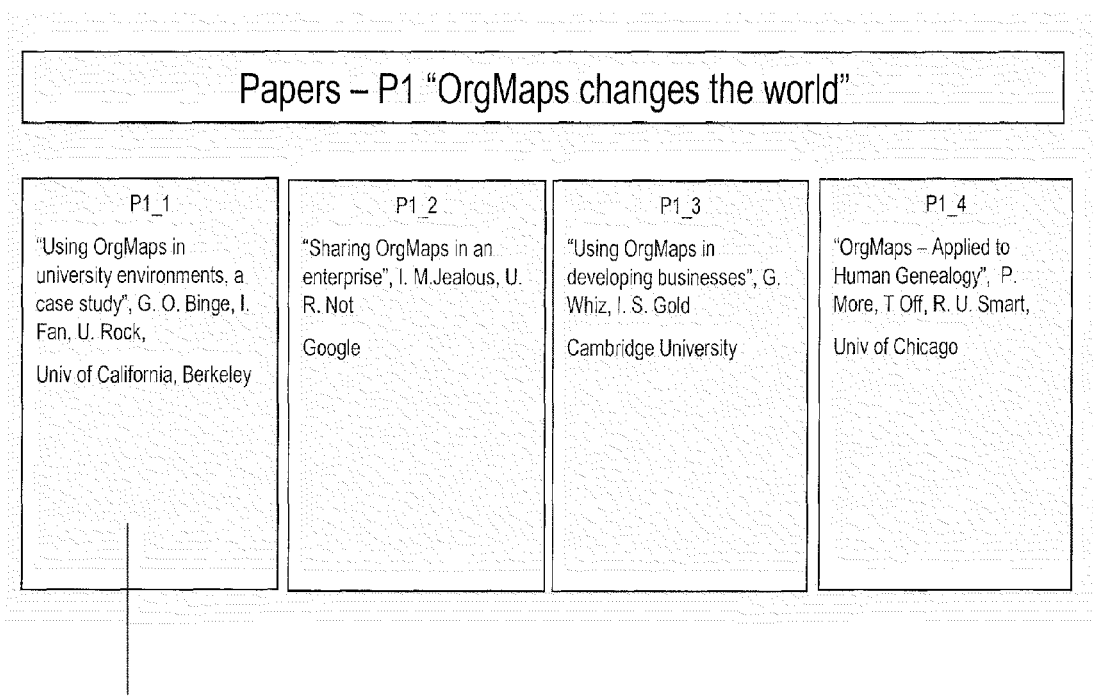

FIG. 4E illustrates a Monday morning papers session P1 view 450 which may be generated by the tool 200 and displayed in the viewing panel 325 by zooming into (e.g., clicking on) the Papers button 412 in the Monday morning view 430 in FIG. 4C, or by zooming into (e.g., clicking on) the Papers session P1 button 443 in the Monday morning papers view 440 in FIG. 4D. The Monday morning papers session P1 view 450 illustrates the four papers (P1_1, P1_2, P1_3 and P1_4) which are being presented in the P1 category (e.g., "OrgMaps changes the world") during the Monday morning session.

Further, if the user selects (e.g., clicks on) one of the papers in the Monday Morning papers view 440 or the Monday morning papers session P1 view 450, the tool 200 may display the selected paper in the GUI 300. For example, if a user selects paper P1_1 445 in either view 440 or view 450, the tool 200 may access a file (e.g., PDF file, Excel file, MS Word file, etc.) for paper P1_1 445 and cause a PDF viewer application (e.g., Adobe Acrobat) to be opened up and display the paper P1_1 445 in the viewer panel 325 of the GUI 300. The viewer panel 325 could be instantiated as a separate window.

Figure 4F:
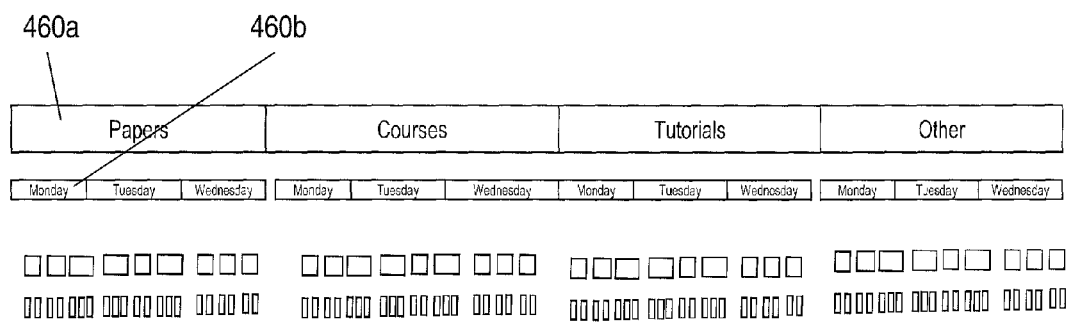

FIG. 4F illustrates a Slice-by-subject view 460 which organizes the information differently and provides a user with a different viewing perspective (e.g., a different dimension) from the views 410-450 which are Slice-by-time views (e.g., a default setting). The slice view 460 may be generated by the tool 200 and displayed in the viewing panel 325 by selecting "Slice by: subject" from the pull down menu 398 in the GUI 300 in FIG. 3B.

In particular, the Slice-by-subject overview 460 displays event categories 460a (e.g., papers, courses, tutorials and other) and displays for each of these categories 460a, subcategories 460b for each day (Monday, Tuesday and Wednesday) of the event. The overview 460 is different from views 410-450 which are sliced by time (e.g., may start with a timeline and then look for categories such as morning, papers, etc.).

Figure 4G:
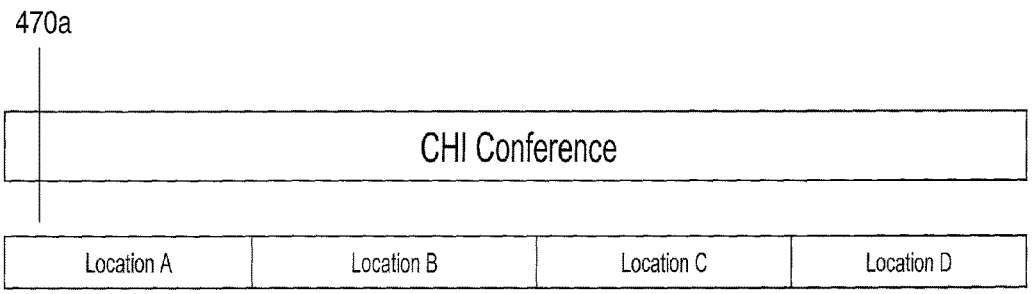
Figure 4G:
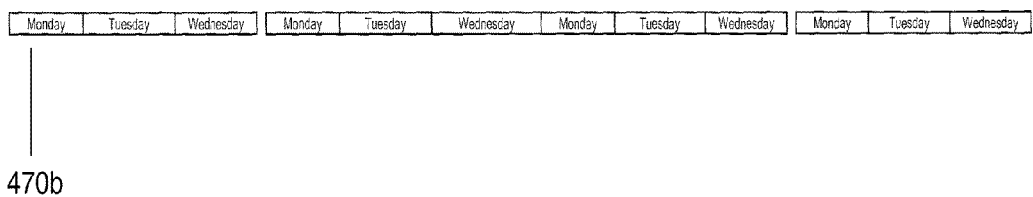

FIG. 4G illustrates a Slice-by-location overview 470 which may be generated by the tool 200 and displayed in the viewing panel 325 by selecting "Slice by: location" from the pull down menu 398 in the GUI 300 in FIG. 3B. The Slice-by-location overview 460 displays location categories 470a (e.g., A-D) and displays for each of these categories 470a, subcategories 470b for each day (Monday, Tuesday and Wednesday) of the event.

The Slice-by-location overview 470 may be helpful, for example, to a conference organizer who is assigning rooms to sessions and would like to ensure that the dimensions of the rooms are sufficient to accommodate the expected attendees. For example, the overview 470 may indicate to the conference organizer that 200 people are planning to attend Wednesday's sessions in Location A but only 50 people are planning to attend the Wednesday's sessions in Location B, and since Location B is much larger than Location B, the organizer may switch Wednesday's sessions between Location A and Location B.

Figure 4H:
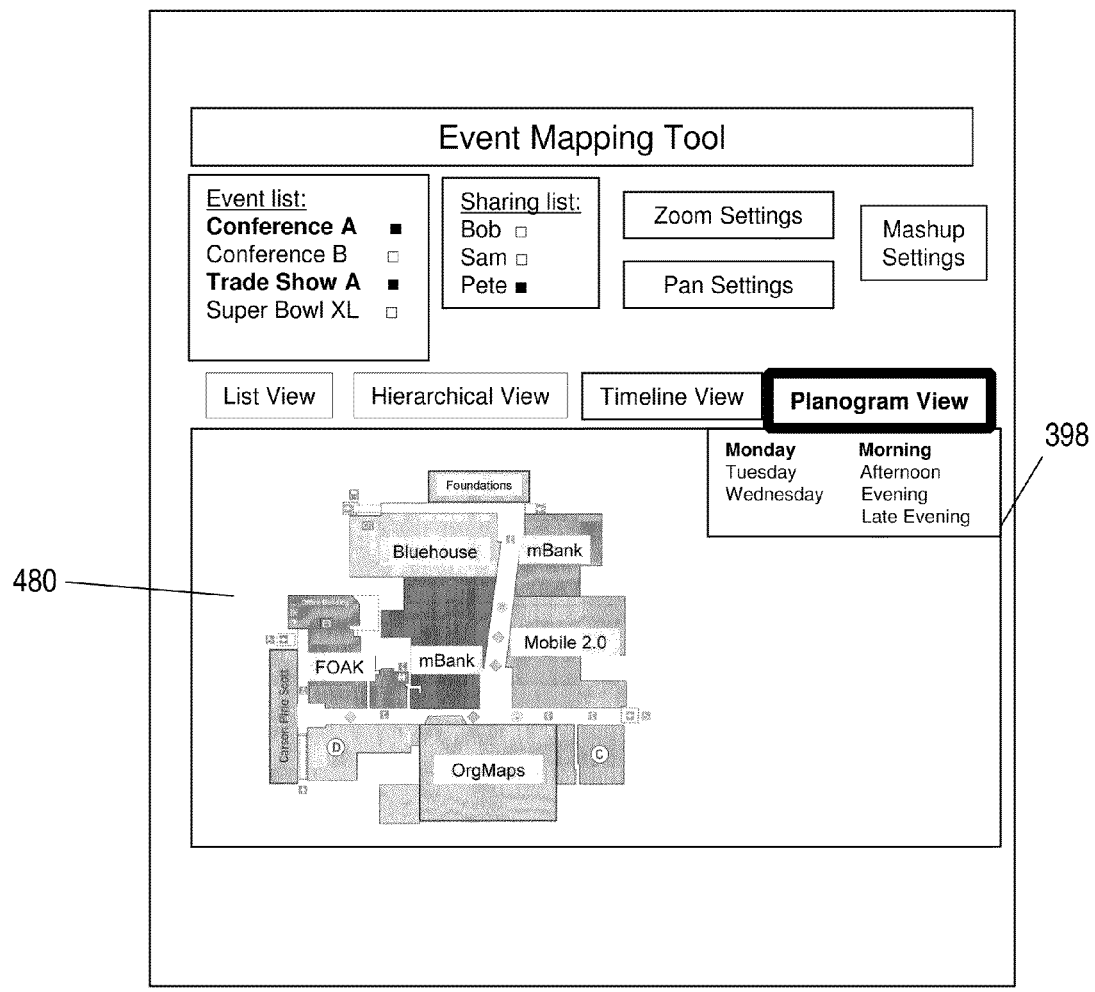

FIG. 4H illustrates a planogram view 480 which may be generated by the tool 200 and displayed in the viewing panel 325 of GUI 325 by clicking on the planogram view button 329. In particular, the planogram view 480 illustrates the locations of the Monday morning sessions which the user may select from the pull down menu which is displayed when the user moves the cursor over the planogram button 329. The default settings of the tool 200 could also be set such that upon a user selecting the planogram button 329, the session displayed initially in the viewing panel is the first session if the event has not yet started, the current session if the event is in progress, or the last session if the event has ended. By zooming into the planogram, additional details relating to the event or to the location may be revealed. For example the seating arrangement for the room, location of doors, windows, lights, HVAC elements, etc., could be revealed. Alternatively, details about the event as described earlier could be revealed—for example all the presentations related to OrgMaps in 480 could be listed when the user zooms in to that part of the planogram or accesses that part of the planogram. Such details can be revealed in an auxiliary window or as overlay.

It should be noted that instead of planogram data, the tool 200 may display map data such as from MapQuest or Google Maps which may be helpful to a user who is attending, for example, a large event having separate venues such as the Superbowl, the Olympics, the Tour de France, the NCAA Final Four Basketball tournament, etc.

FIGS. 5A-5D illustrate exemplary timeline views 510-540 which may be generated by the view generator 215 of the present invention and displayed in the viewing panel 325 of the GUI 300.

Figure 5A:
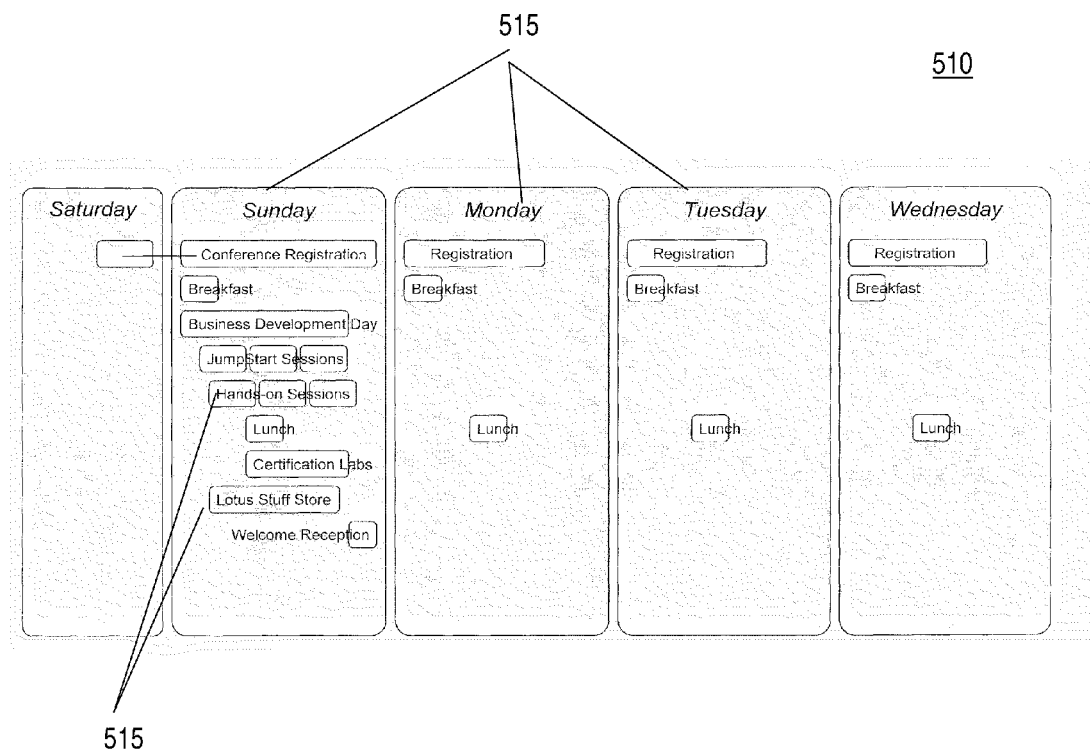

For example, FIG. 5A illustrates a timeline Overview 510 (e.g., default view) which may be displayed in the viewing panel 325 by selecting (e.g., clicking on) the timeline view button 328 in FIG. 3A. The timeline Overview 510 is segmented into daily segments 515 (e.g., Saturday-Wednesday) from left to right, and the sessions/activities 520 for each day are listed in chronological order from top to bottom. That is, the earliest sessions are listed at the top for each daily segment 515, and the latest sessions are listed at the bottom for each daily segment 515.

Further, the "bar" representing the sessions/activities 520 are located on the timeline view 510 in a position which reflects the time of the session/activity, and the length of bar reflects the duration of that session/activity.

Figure 5B:
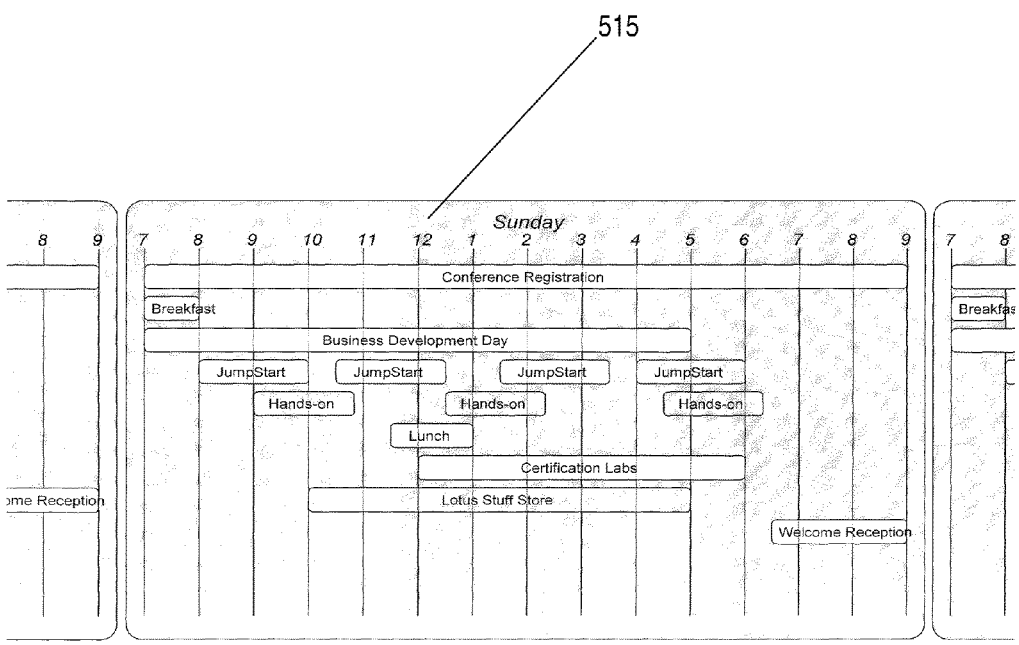

FIG. 5B illustrates a timeline Sunday view 520 which may be displayed in the viewing panel 325 by selecting (e.g., clicking on) the Sunday segment 515 in the timeline Overview 510. A view such as view 520 may allow the user the view the start and stop times for the sessions/activities with more detail. For example, by viewing the view 520, a user can see that conference registration begins Sunday at 7:00 and ends Sunday at 9:00, and so on.

Figure 5C:
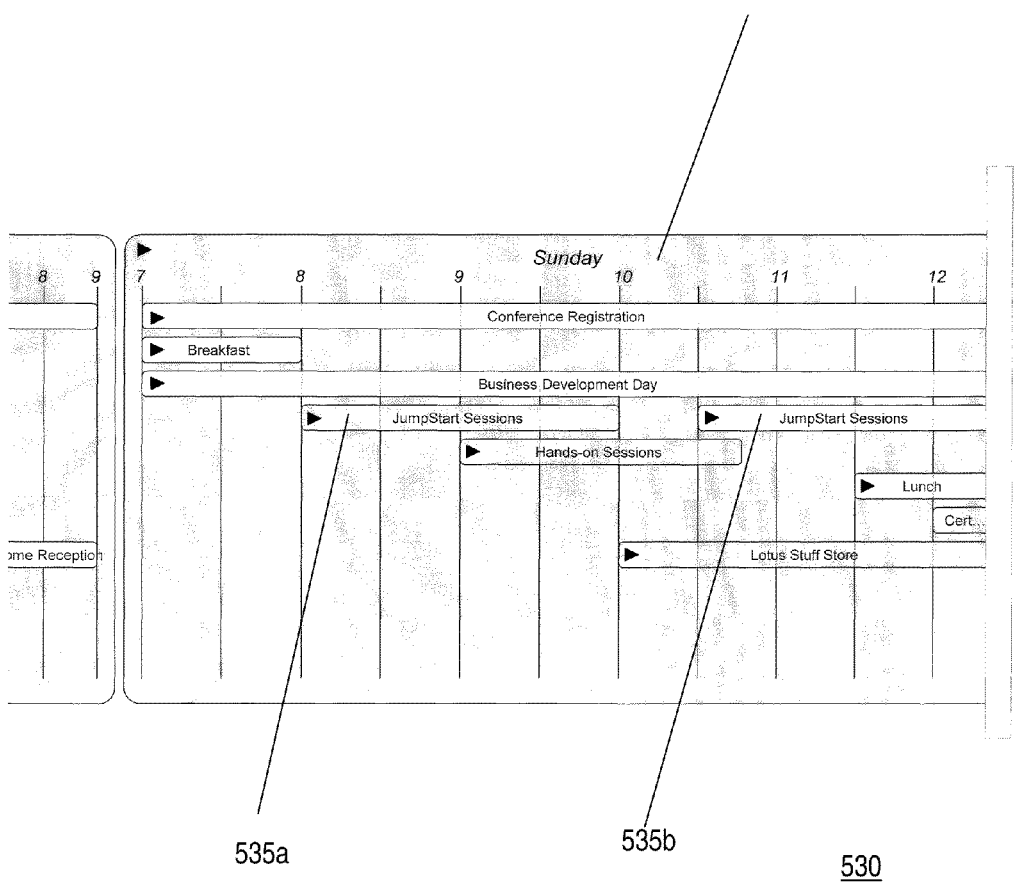

FIG. 5C illustrates a timeline Sunday morning view 530 which may be displayed in the viewing panel 325 by selecting (e.g., clicking on) the morning portion (e.g., the AM portion) of the Sunday segment 515 in the timeline Sunday view 520. A view such as the morning view 530 may allow the user the view the start and stop times for the sessions/activities conducted on Sunday morning with more detail.

FIG. 5D illustrates a timeline Sunday morning calendar expansion view 540 which may be displayed in the viewing panel 325 by selecting (e.g., clicking on) the bar (e.g., the triangle at the left of the bar) representing the JumpStart sessions 535a and 535b in the timeline Sunday morning view 530 in FIG. 5C. A view such as the view 540 may provide the user with a more detailed view of the presentations to be presented in the JumpStart sessions 535a, 535b, and the location of the presentation. For example, by viewing JumpStart sessions 535a of the timeline Sunday morning calendar expansion view 540, the user may know that a presentation by Presenter A entitled "Understanding Security in IBM Lotus Notes and Domino" will be given from 8:00 to 10:00 on Sunday morning in the "Swan" room of the conference center, and so forth.

Thus, as illustrated in FIGS. 5A-5D, the timeline view of the tool 200 may provide two basic navigation dimensions. First, the user may pan and zoom on a time axis. Second, the user may expand/contract in details of sessions/activities. Location may be used in the timeline view as a vertical dimension within a session.

In summary, the tool 200 may provide a framework for creating compelling event sites that facilitate interaction, discovery and collaboration, by 1) visualizing an event as a large canvas that can be zoomed and panned (e.g., support smooth transitions between overview and detail views, and support hierarchical organization into tracks, sessions, etc., 2) Make the canvas a mashup substrate for overlaying information (e.g., the tool 200 should be extensible to mashups from other data sources, and 3) interoperate with other visualizations, such as planograms for mapping the event locations.

Figure 6:
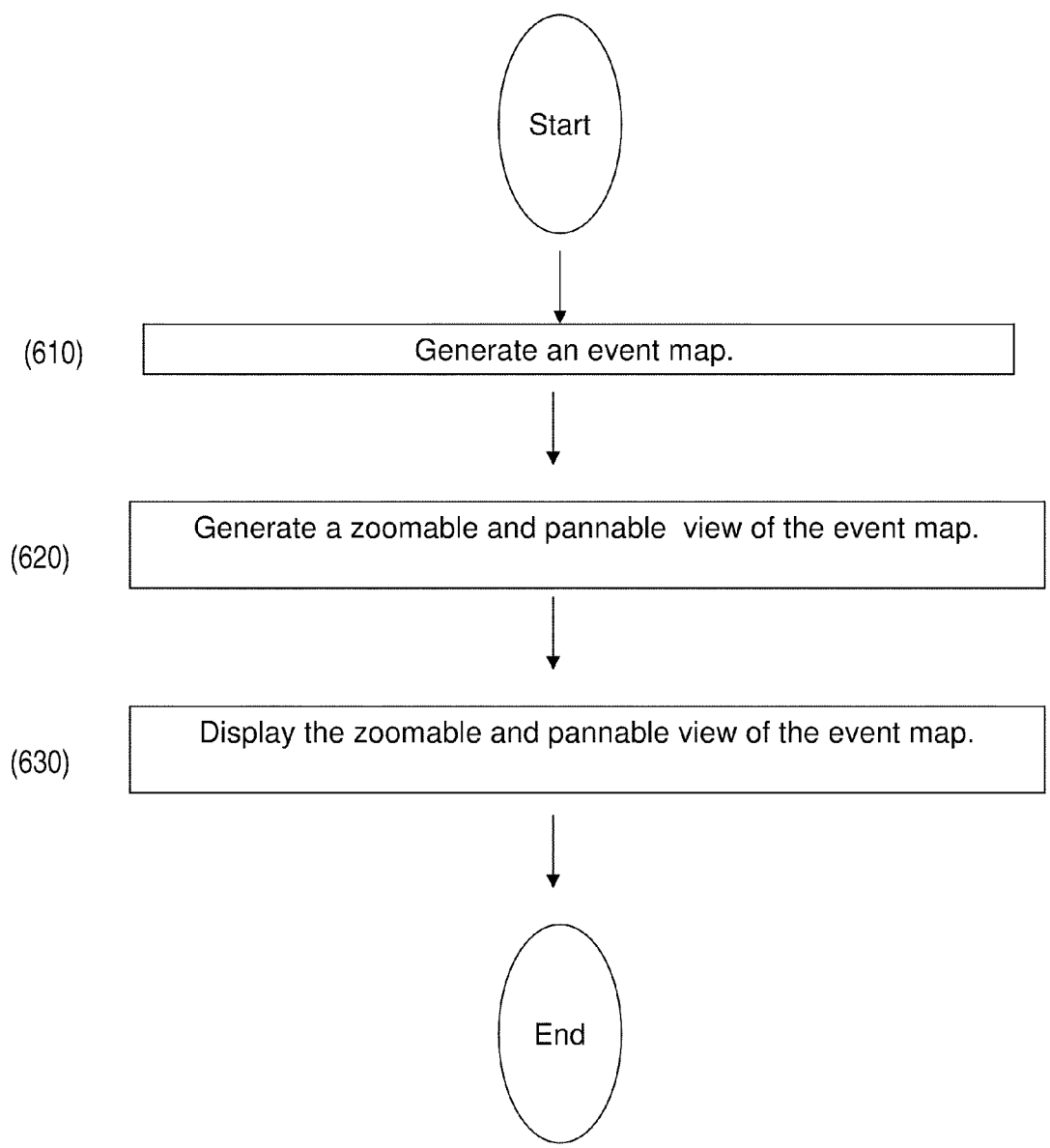
FIG. 6 illustrates a method 600 of mapping an event, in accordance with an exemplary aspect of the present invention.

FIG. 6 illustrates a method 600 of mapping an event, according to an exemplary aspect of the present invention. The method 600 includes generating (610) an event map, generating (630) a zoomable and pannable view of the event map, and displaying (640) the zoomable and pannable view of the event map.

Referring now to FIG. 6, system 600 illustrates a typical hardware configuration which may be used for implementing the inventive method, tool and system. The configuration has preferably at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, pointing stick 627 and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639. Further, an automated reader/scanner 641 may be included. Such readers/scanners are commercially available from many sources.

The Annotating Tool

Figure 7A:
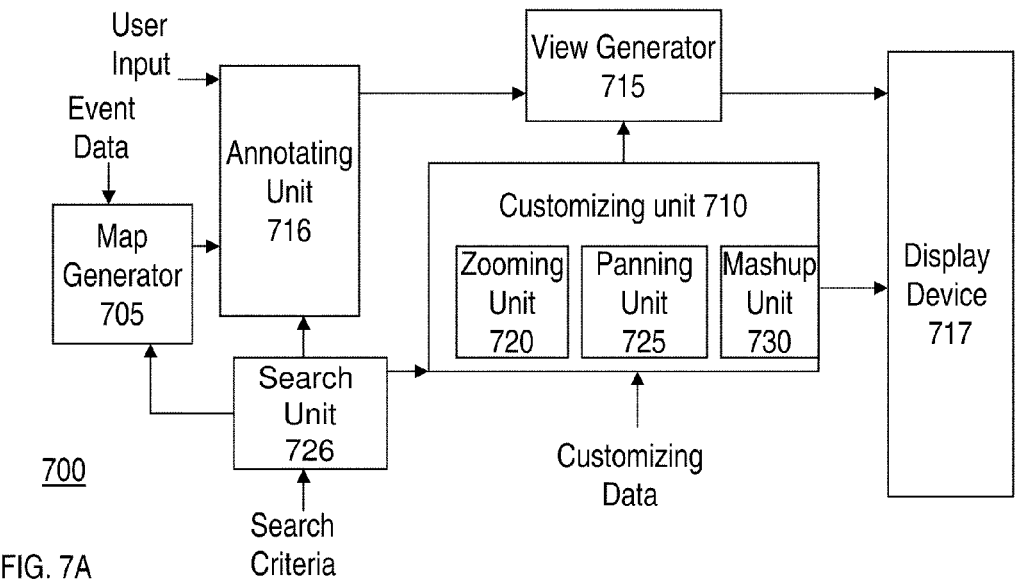
FIG. 7A illustrates a tool 700 for annotating an event map.
Figure 7B:
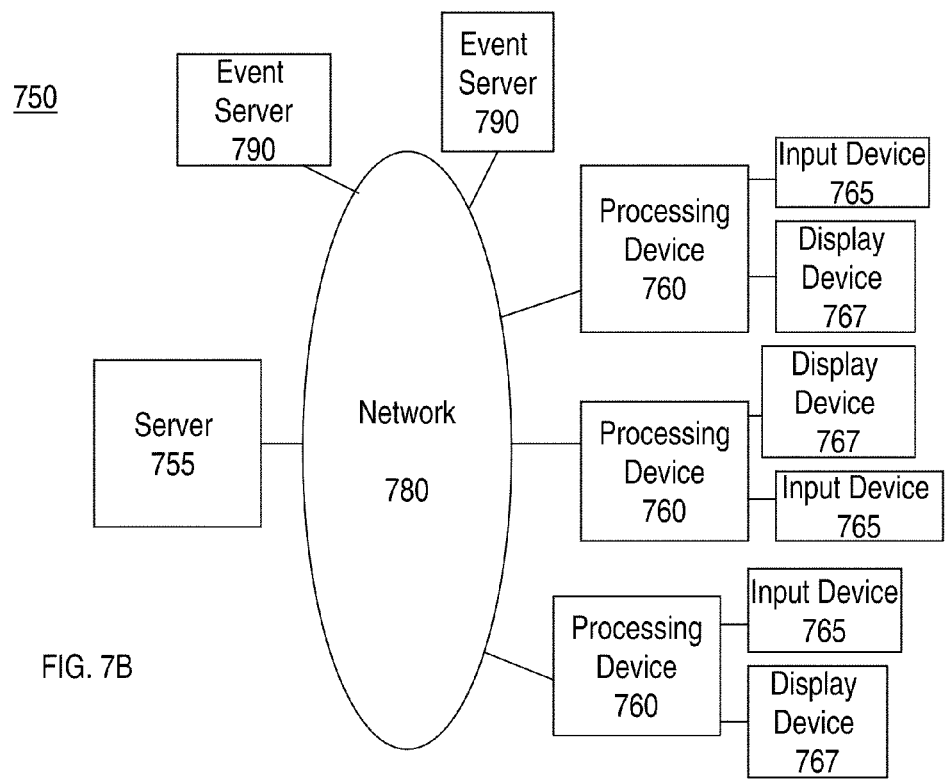
FIG. 7B illustrates a system 750 for annotating an event map, in accordance with an exemplary aspect of the present invention.

FIGS. 7A-7B illustrate a tool 700 for annotating an event map, according to an exemplary aspect of the present invention. A user may use the annotating tool 700 to embed elements including personal, business, community, and/or collaboration elements in the substrate of an event map (e.g., a hierarchical event map).

As illustrated in FIG. 7A, the tool 700 includes a map generator 705 for generating an event map (e.g., based on event data), an annotating unit 716 for annotating the event map based on a user input, a view generator 715 for generating a zoomable and pannable view of the annotated event map, and a display device 717 for displaying the zoomable and pannable view of the annotated event map. The user input may include, for example, information entered by a user such as ratings, tags, the likelihood that the user will attend a particular session, comments, time, location, translations, interpretations, the presence or absence of a particular person or group of persons, the number of people present (e.g., at an event session), or information (e.g., image files, text files, messages, etc.) obtained from a database or network (e.g., the Internet) which is input to the annotating unit 716 at the direction of the user. Other system-generated information that may be added to the annotation may include, for example, the location of the user, the location of the event, the time at which the annotation was created. The tool 700 may also include an authenticating unit which may require a user to be authenticated in order to annotation an event map. In other cases (e.g., cases which do not require authentication), an annotation may be made by a user anonymously.

The annotations on the event map may be played back in a time-sequenced manner so that a user can determine how the annotations came about in time and, in essence, replay the annotations as they annotations occurred. The annotations made by the annotating unit 716 may also be displayed (e.g., visualized) graphically using techniques (e.g., well-known techniques) such as histograms, color saturation, pie-charts, etc.

The tool 700 may also include a search unit 726 for performing a keyword or a more advanced search of the event map based on search criteria that may be input (e.g., to the search unit 726) by the user. As indicated in FIG. 7A, the search may be performed at the map generator 705 on an event map which has not been customized and has not been annotated. For example, this may allow the user to search the features of the event map to determine which sessions he would like to attend.

The search unit 726 may also perform a search at the annotating unit 716 on an event map that has been annotated but before a view of the annotated event map has been customized in the customizing unit 710. The search unit 726 may also perform a search at the customizing unit 710 on an event map that has been annotated and after a view of the annotated event map has been customized (e.g., to reflect the user's attendance data).

The search unit 726 may also include a data mining tool for mining data in the event map. For example, the search unit 726 may be used by an event organizer to collect and analyze the comments of the attendees in order to predict future attendee behavior such as the subjects, speakers and locations which attract and satisfy the most attendees, etc. The search unit 726 may also be used by event organizers to determine the amount capacity required in either the physical space or in the computing infrastructure to support the event. For example, using the search unit 726 the event organizer may determine that several hundred people have indicated that they are likely to attend a particular session. The organizer can then use this information to ensure that the session is conducted in a room that seats several hundred people.

FIG. 7B illustrates a system 750 for annotating an event map, according to an exemplary aspect of the present invention. As illustrated in FIG. 7B, the system 750 may include a server 755 which may include a memory device (e.g., hard drive, RAM, CD-ROM, etc.) which may store the annotating tool 700. The system 750 may also include plural processing devices 760 (e.g., an electronic device such as a camera, mobile phone, desktop computer, laptop computer, handheld device, personal digital assistant (PDA), Blackberry device, etc.) which may include a memory device (e.g., hard drive, RAM, CD-ROM, etc.) for storing the annotating tool 700.

The processing device 760 may be connected (e.g., via wired or wireless communication link) to the server 755 via a network 780 (e.g., the Internet). A user may use an input device 765 (e.g., keyboard, mouse, touchpad, microphone etc.) which is connected to the processing device 760 in order to input data (e.g., comments) to annotate a event map, and to view or manipulate data displayed in the annotated event map on the display device 767.

The system 750 may also include one or more event servers 790 which may store event data relating to an event such as a conference, tradeshow, convention or sporting event. For example, such event data may include the topics for discussion by day, time, session (e.g., morning, afternoon and evening session), the location of sessions, and planogram data. For example, the server 790 may store the event data in the form of a list or a table, and the annotating tool 700 (e.g., stored on either the server 755 or a user's processing device 760) can access that event data and use the accessed event data to generate a event map (e.g., in the event map generator 705) which may be annotated by the user using the processing device 760.

The annotated event map may be displayed in a display screen of the display device 767 in response to a user input. In particular, the memory device of the processing device 760 may store a browser (e.g., a Web browser such as Internet Explorer) for viewing the annotated event map.

As illustrated in FIG. 7A, the annotating tool 700 may also include features discussed above with respect to the tool 200 (e.g., customizing tool 710, zooming unit 720, panning unit 725 and mashup unit 730). However, unlike the tool 200 which may be used to customize a view of an event map based on customizing data (e.g., customize a view of the event map based on the sessions which the user (e.g., or a colleague or co-worker of the user plans to attend), the annotating tool 700 may also be used to annotate the event map (e.g., attach one or more tags such as comments to features of the event map), embed applications (e.g., widgets) in the event map, etc.

Figure 8A:
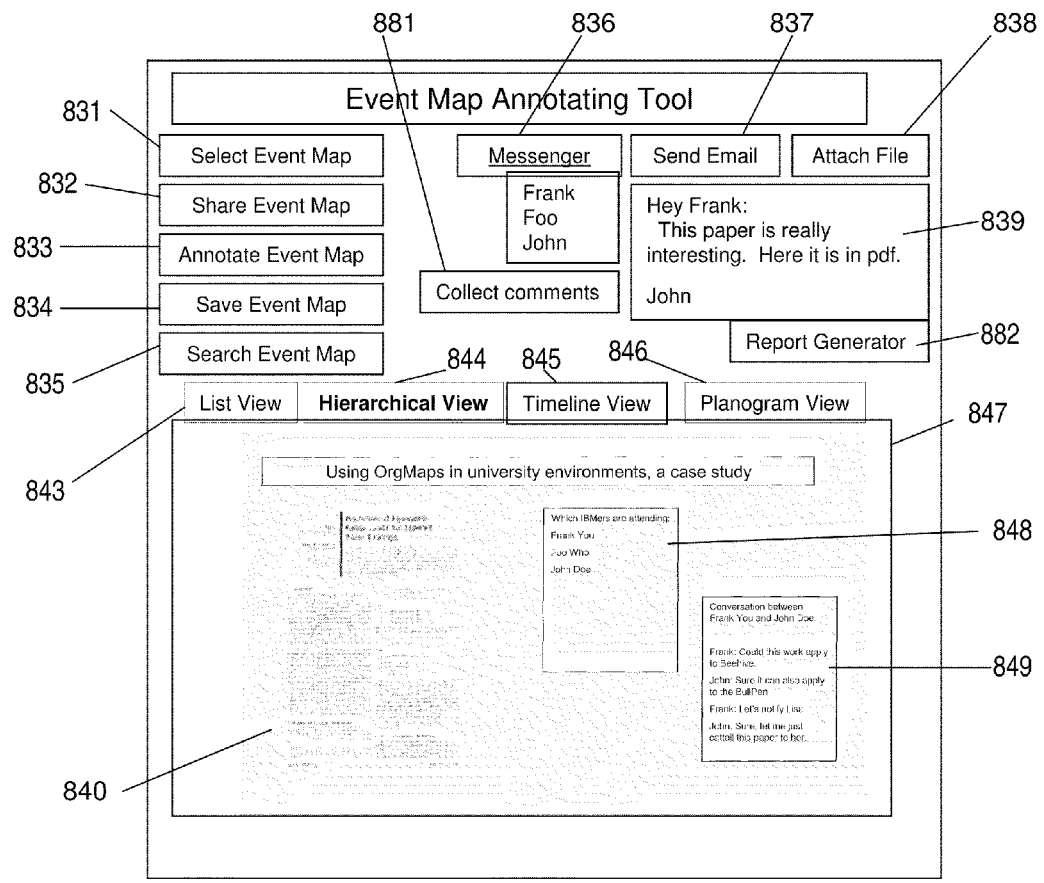
FIGS. 8A-8C illustrate views 840-842 of an annotated event map which may be generated by the tool 700, in accordance with an exemplary aspect of the present invention.
Figure 8B:
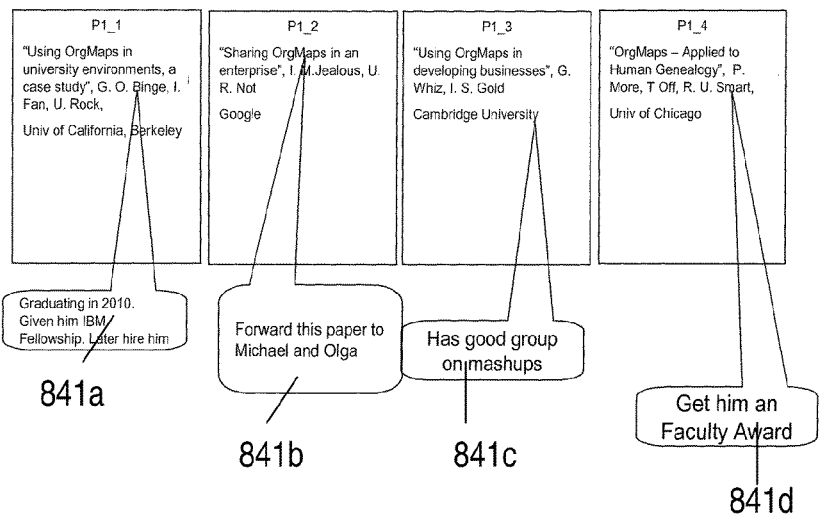
Figure 8C:
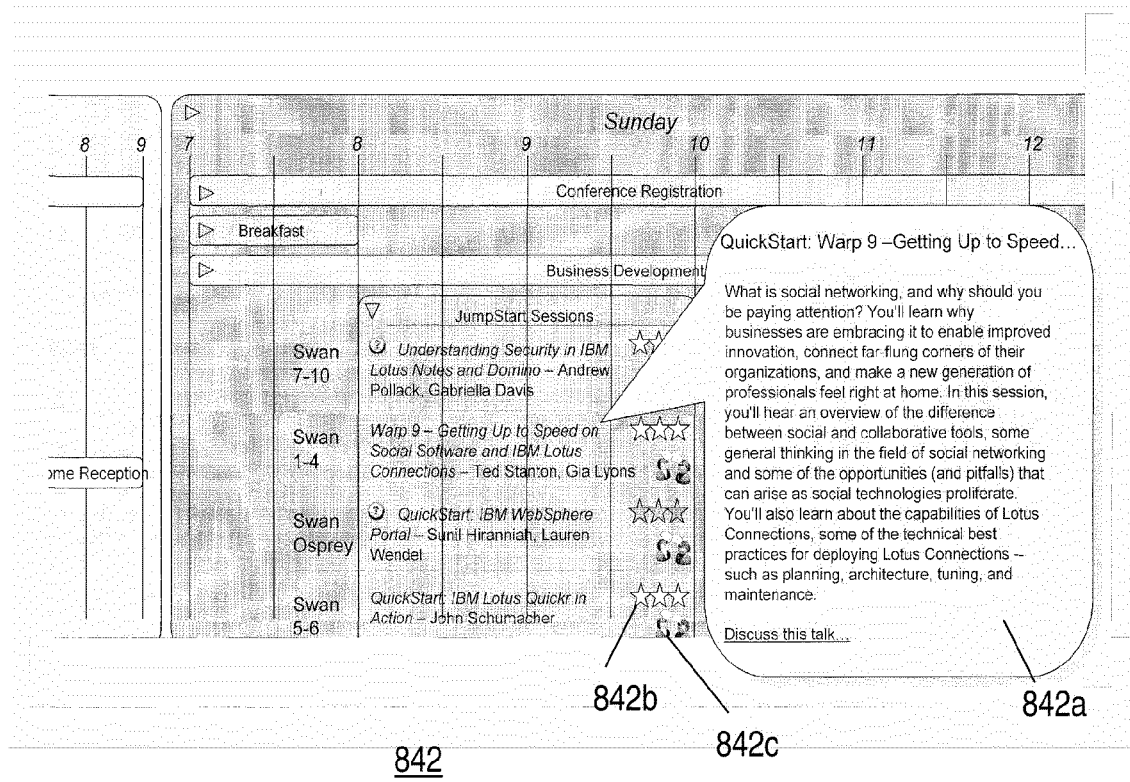

FIGS. 8A-8C illustrate a graphical user interface (GUI) 800 and views 841-843 of an annotated event map, according to an exemplary aspect of the present invention.

FIG. 8A illustrates a graphical user interface (GUI) 800 which may be generated by the tool 700 and displayed on the display device 767, according to an exemplary aspect of the present invention. In FIG. 8A, the user has selected the hierarchical view to be displayed in the viewing panel 847, according to an exemplary aspect of the present invention. As illustrated in FIG. 8A, the event map which is displayed in the viewing panel 847 may be provided on a mashable substrate that is zoomable, pannable, and mashable. That is, the mashable substrate can be panned left and right or in other directions such as top to bottom, zoomed into and out of and configured based on a user input.

The GUI 800 may include a Select event map button 831 for selecting an event map (e.g., plural event maps). The GUI 800 may also include a Share event map button 832 for selecting an entity (e.g., person, organization, corporation) with which to share an event map (e.g., an annotated event map). That is, the button 832 may control a security level or distribution list for an annotated event map.

The GUI 800 may also include an Annotate Event Map button 833 which the user may select in order to annotate (e.g., attach a tag such as a comment onto a feature of an event map which is displayed in the viewing panel 847), a Save event map button 834 for saving an annotated event map (e.g., in the processing device 760, event server 790, an employer's network server, etc.), and a Search event map button 835 for searching an event map (e.g., searching the tags (e.g., comments) which are tagged to plural event maps). Annotations may also be made in-place directly on the screen with the use of button 833 by switching to a mode that allows in-place annotations attached to screen elements and data objects associated with the screen elements. The annotating tool 700 may be used to make changes to the event such as change the venue, time or details for the event such as a speaker's name. Such capabilities may be used by event planners to make changes before, during or after the event is complete.

The GUI 800 may include an Messenger button 836 which may be used by the user to send a message (e.g., instant message (IM), text message (short message service (SMS), etc.), and a Send email button 837 for sending an email, an Attach file button 838 for attaching a file to an email, and a Composing area 839 for composing an email or a message (e.g., instant message, text message, etc.). The list of valid recipients could include a selection from those who are registered for the event, a selection from those who are presently attending the session, a selection from the user's contact list or address book, etc., The list of recipients could be filtered by a variety of criteria such as recipient's affiliation, personal particulars, etc.

The GUI 800 also includes the viewing panel 847 for viewing the annotated event map, and a List View Button 843, Hierarchical View button 844, Timeline View button 845 and a Planogram View button 846 which may be selected by the user in order to display either a List, Hierarchical, Timeline or Planogram view of the annotated event map in the viewing panel 847, respectively.

FIG. 8A also illustrates a hierarchical view 840 of an annotated event map. Specifically, FIG. 8A illustrates a case in which the user has "zoomed" into a paper entitled "Using OrgMaps in university environments, a case study". The event map has also been tagged with a first annotation (e.g., tag) 848 which states "Which IBMers are attending: Frank You, Foo Who and John Doe", and a second annotation 849 which includes a conversation conducted between Frank You and John Doe.

The conversation in annotation 849 could be, for example, an instant message conversation conducted between Frank and John. The conversation could be tagged to the view 840 of the paper, for example, by selecting the Message button 836 of the GUI 800, either before, during or after the event is conducted. Further, the user could save the event map and later may open the event map using the GUI 800 in order to read the second annotation 849 which is tagged to the paper.

The tool 700 may include a capture unit which may allow the annotated event map to be snapshotted, e.g., captured in a format suitable for export or sharing with another individual. Such exporting or sharing can be done by writing captured data out to a shared server, sending by email or instant messaging and so on.

FIG. 8B illustrates a hierarchical view 841 of an annotated event map, according to another exemplary aspect of the present invention. In the view 841, the user has zoomed into session P1 ("OrgMaps change the world") on the event map, and tagged four papers (P1_1, P1_2, P1_3 and P1_4) in the session with comments 841a, 841b, 841c and 841d, respectively.

FIG. 8C illustrates a timeline view 842 of an annotated event map, according to another exemplary aspect of the present invention. The view 842 may include an Abstract pop-up view 842a which may appear (e.g., overlaid on the timeline view or on a side of the timeline view) when the user moves his cursor over a paper, presentation, location, etc. in the viewing panel 847. These pop-up views may be added to a separate area of the event map such as an auxiliary canvas, representing the set of items that the user has deemed to be interesting. The auxiliary canvas can itself be zoomed or panned like a parent event map.

In addition, in the view 842, the user has zoomed into the Sunday Morning view, which displays a rating indicator 842b (e.g., highlighted/non-highlighted stars) of the presentations in the 8:00 am Jumpstart session on Sunday morning. The rating indicator 842b may be generated by the tool 800. For example, the rating indicator 842b could be the user's personal rating or could be a average rating of all of the attendees of the event who have input their personal rating.

The view 842 also includes a discussion widget 842c which the user may select in order to initiate and/or participate in a discussion of a feature (e.g., a paper discussion in a session) with other attendees, or the author or presenter at the event. That is, a user may access a discussion of a presentation, paper etc. of the event through a link, pop-up, etc. which is displayed on the event map (e.g., on the presentation or paper displayed in the view of the event map). The discussion outlined above can happen before the event occurs, while the event is in progress or after the completion of the event.

The user may also access details of a presentation, paper etc. at the event (e.g., an abstract of a paper) through a pop-up dialog box (e.g., the stopping point for in-substrate navigation).

An annotation (e.g., a tag such as a comment which is tagged to the event map) may be but is not necessarily related to a session which the user plans to attend or is currently attending (e.g., "This presenter is a real dud"), or to a paper to be presented in a session (e.g., "The data supporting this guy's conclusions is weak"), or to a location of a session (e.g., "This room is too small for this session"), and so on.

Further, a view of the event map to which the user may attach a tag (e.g., a comment) with the annotating tool may be customized or not customized. That is, it is possible for the user to use the annotating tool 700 to attach a tag (e.g., comment) onto a view of event map that has been customized, for example, to include the user's attendance data (e.g., highlighting sessions which the user is attending, highlighting locations of the sessions which the user is attending on a planogram view, etc.), but it is not necessary that a view of the event map be so customized.

The annotating tool 700 may allow a user to add notes, comments, questions, messages, ratings, etc., to an event map (e.g., an event map that has been generated by map generator 705) and/or to search the event map (e.g., performing a keyword or advanced search of the event map including the comments tagged to the event map). The annotating tool 700 may also allow a user to conveniently collaborate with friends, colleagues, co-workers, etc. regarding features of the event map. For example, the annotating tool 700 may allow a user to conveniently send an instant message or text message to a co-worker to request information about a presentation, paper, lunch location, speaker, etc.

The annotating tool 700 may also allow a user to conveniently store an annotated event map (e.g., store the annotated event map in a memory device of the processing device 767 or the event server 790, or the network server of the user's employer). For example, after an event, a user may keep the annotated event map for his records or for his employer's records. The user may also refine his comments that he initially annotated to the event map. For example, years after a conference is conducted, the user may further annotate his event map for the conference with additional comments, or the user may edit his initial annotation to include additional comments regarding a speaker, a paper, a location pertaining to the event, etc. The user may keep the annotated event map personal and to himself and not share the annotated event map with any other entity, or the user could click on the Share event map button 832 in order to share the annotated event map with one or more individuals.

The user may also return to the event map years later to search for a speaker at the conference, or search for a paper which was presented at the conference, or to help him recall the hotel where he stayed in the past. The user could also link an annotated event map to another event map which the user attended years ago. The user could also link a portion (e.g., a paper session, tutorial, etc.) of an annotated event map to a portion (e.g., a paper session, tutorial, etc.) of another event map which the user attended years ago.

The annotating tool 700 also may provide a mechanism for the user to collect and organize the comments that he annotated to an event map or over plural event maps. For example, as illustrated in FIG. 8A, the GUI 800 may include a Collect comments (e.g., annotations) button 881 which may cause an MS Excel file to be generated and displayed in the viewing panel 847. The file may include, for example, columns which list the tags (e.g., comments) which were tagged to an event or to plural events, the session (e.g., paper, presentation) to which the tag was tagged, and the time the tag was tagged to the event map.

The GUI 800 may also include a Report generator button 882 which the user may select (e.g., "click on") in order to generate a report (e.g., an Expense Report, trip Report, etc). For example, if the user selects the Report generator button 882, a fillable form (e.g., a PDF file, Excel File, etc.) may be generated and appear in the viewing panel 847 of the GUI 800. The user could fill out the form in the viewing panel 847 and then select the Send email button 837 in order to send the completed form to his supervisor, his company's human resources department, his bar association, etc. This may make it more convenient for an employee to report his attendance at a conference, and for an employer or organization (e.g., a bar association) to confirm the user's attendance at a conference.

The annotating tool 700 may allow the user to conveniently collaborate with co-workers, colleagues, etc. The annotating tool 700 may also include a discussion board type feature which allows the user to correspond with other attendees. For example, the event server 790 may host a discussion board which the user can access by clicking on icon 842c in FIG. 8C, or by using the annotating tool 700 to log onto his account for the event. Once the user has logged on, the user can zoom in on a session and join a discussion (e.g., a discussion about the speaker, the paper being discussed, etc.) with other attendees of the session.

The above capabilities of the tool 700 may allow the user to network and share ideas with other attendees of a session even if the user is not physically present in the session. For example, the user could stay in his hotel room and "remotely attend" one or more of the sessions and even collaborate with his co-workers who are physically present at the session, or participate in the discussion in those sessions via the annotating tool 700. In particular, the annotating tool 700 may allow a user to perform collaborative attending, tagging, and/or mining with structure instead of straight-line tagging.

In short, the annotating tool 700 may make annotations on the canvas (e.g., substrate) of the event map. These annotations (e.g., tags) can be related to the content of a session (e.g., paper quality, relevance to the user's employer, etc.), recommendations (e.g., identify co-workers who might be interested in a paper presented at the event, co-workers who should read the paper, etc.), people (e.g., identify students presenting at an event that the user's company must hire, identify a rising star student, or connect the student to a company's Campus Relationship Manager, etc., or identify faculty who should be nominated for the company's Faculty Award), research projects (e.g., mark related projects on a research project wiki), universities (e.g., note that a university of a faculty member author is doing a lot of work in remote health monitoring), and so on.

The annotating tool 700 may also allow a user to aggregate and correlate the business intelligence layers across plural events and across plural users. For example, thousands of annotated event maps of several hundred of the company's employees could be stored over several years, and the company's Campus Relationship Manager could search the annotated event maps to acquire a name of a candidate for employment to pursue for the company. This could be based, for example, on the number of tags returned by the search for a student, the quality of the tags for the student, and so forth.

Further, the annotations (e.g., tags) which the user may tag to the event map be private or may have some access control scoping. This feature may include a business intelligence layer added over a publicly available information canvas. For example, the employees of a company could tag privately for the company's benefit, whereas general users may just tag for social benefit.

A "remote attendee" user could use the annotating tool 700 to interact with an event site (e.g., a session at the event) during the conference. The user could post a technical request using the tool 700, or post a non-technical request (e.g., "Could you please find out if student Y is really good or riding on Z's coat-tails . . . "). This may allow the user to participate with people who are physically at the event.

The annotation tool 700 may also include a reader (e.g., a really simple syndication (RSS) reader) which would allow the user to view (e.g., in the viewing panel 847) frequently updated works (e.g., such as blog entries, news forums, wikis, annotations, news headlines, audio, and video). The reader may check the user's subscribed feeds regularly for new work, download any updates that it finds, and generate a view of the updated work in the viewing panel 847.

For example, a user could subscribe to an RSS feed from an event, and request a list of papers or presentations tagged "related to Bluebird" by employees of a particular company in conferences in 2008.

Further, the annotating tool 700 may allow a user to aggregate items of interest across plural events. For example, if the event is an annual event, the user may aggregate items of interest for the events that he attended over plural years. This would allow a user to determine, for example, how a university's participation in a particular conference has changed over the years, or to see the development of a competitor's research, and so on.

Further, digital libraries of organizations such as the Association for Computing Machinery (ACM) or the Institute for Electrical and Electronics Engineers (IEEE) could make available their annotations (e.g., tags) on event maps so that others can benefit from previous readers. Users may download the content and consume the material electronically on their personal devices such as PCs, electronic readers such as Amazon Kindle, etc., and contribute back annotations to the event maps hosting site.

The annotating tool 700 may also allow a user to annotate the event map (e.g., tag the event map) with code (e.g., a portable chunk of code such as a widget, gadget, badge, module, webkit, capsule, snippet, mini or flake) that can be installed and executed within a separate HTML-based web page without requiring additional compilation. The code may use, for example, DHTML, JavaScript, or Adobe Flash, and may add some content to the event map that is not static. That is, the annotating tool 700 may be used by the user to embed application elements into an event map (e.g., an extension of widget technology).

In particular, the code may relate to a feature of the event map and be displayed as being attached to (e.g., pinned to) the feature of the event map. That is, the event map substrate may include "mini-applications" which are attached to (e.g., pinned to) features (e.g., sessions, tracks, locations, etc.) of the event map.

Figure 9:
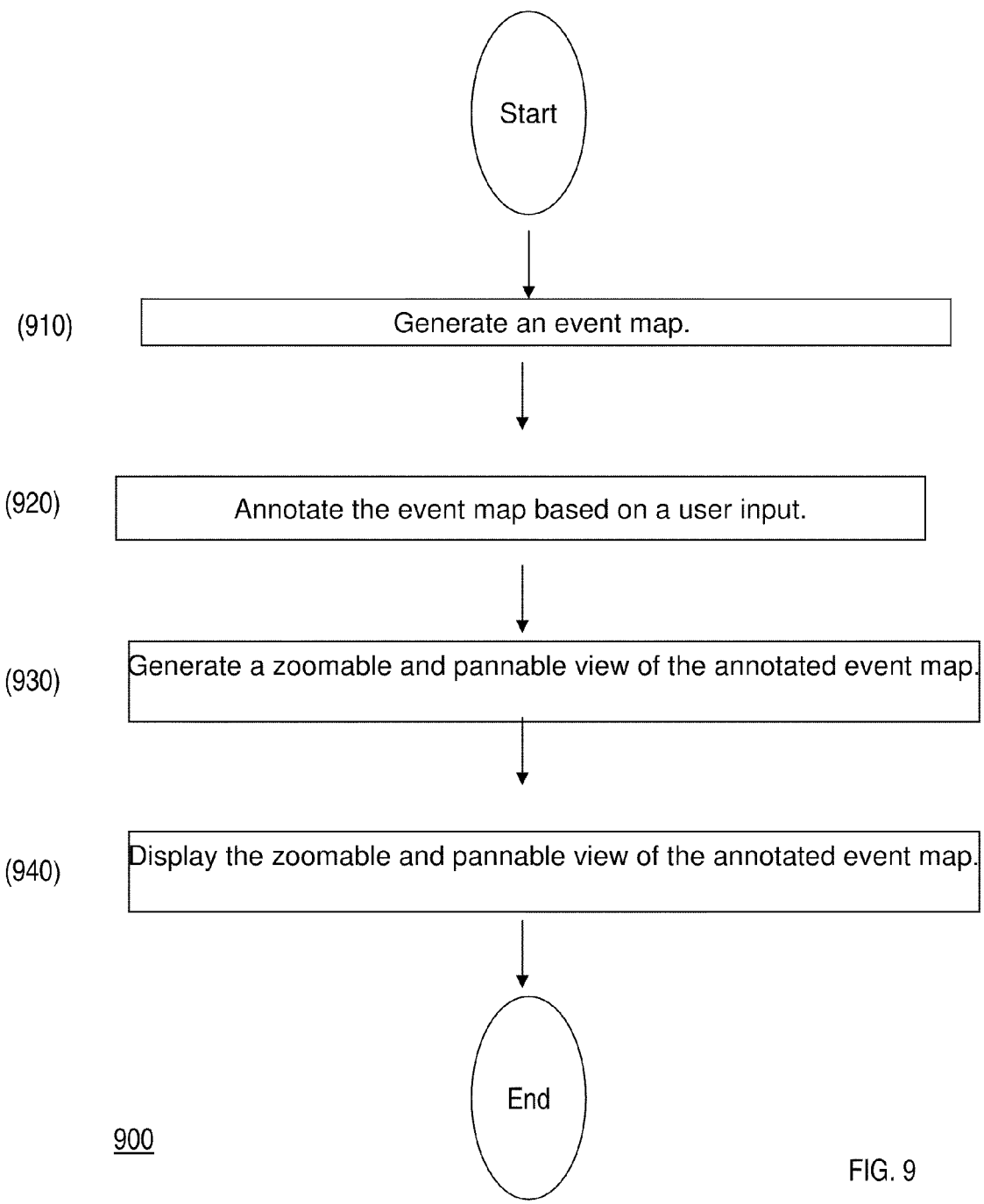
FIG. 9 illustrates a method 900 of annotating an event map, in accordance with an exemplary aspect of the present invention.

FIG. 9 illustrates a method 900 of annotating an event map, according to an exemplary aspect of the present invention. The method 900 includes generating (910) an event map, annotating (920) the event map based on a user input, generating (930) a zoomable and pannable view of the annotated event map, and displaying (940) the zoomable and pannable view of the annotated event map.

Figure 10:
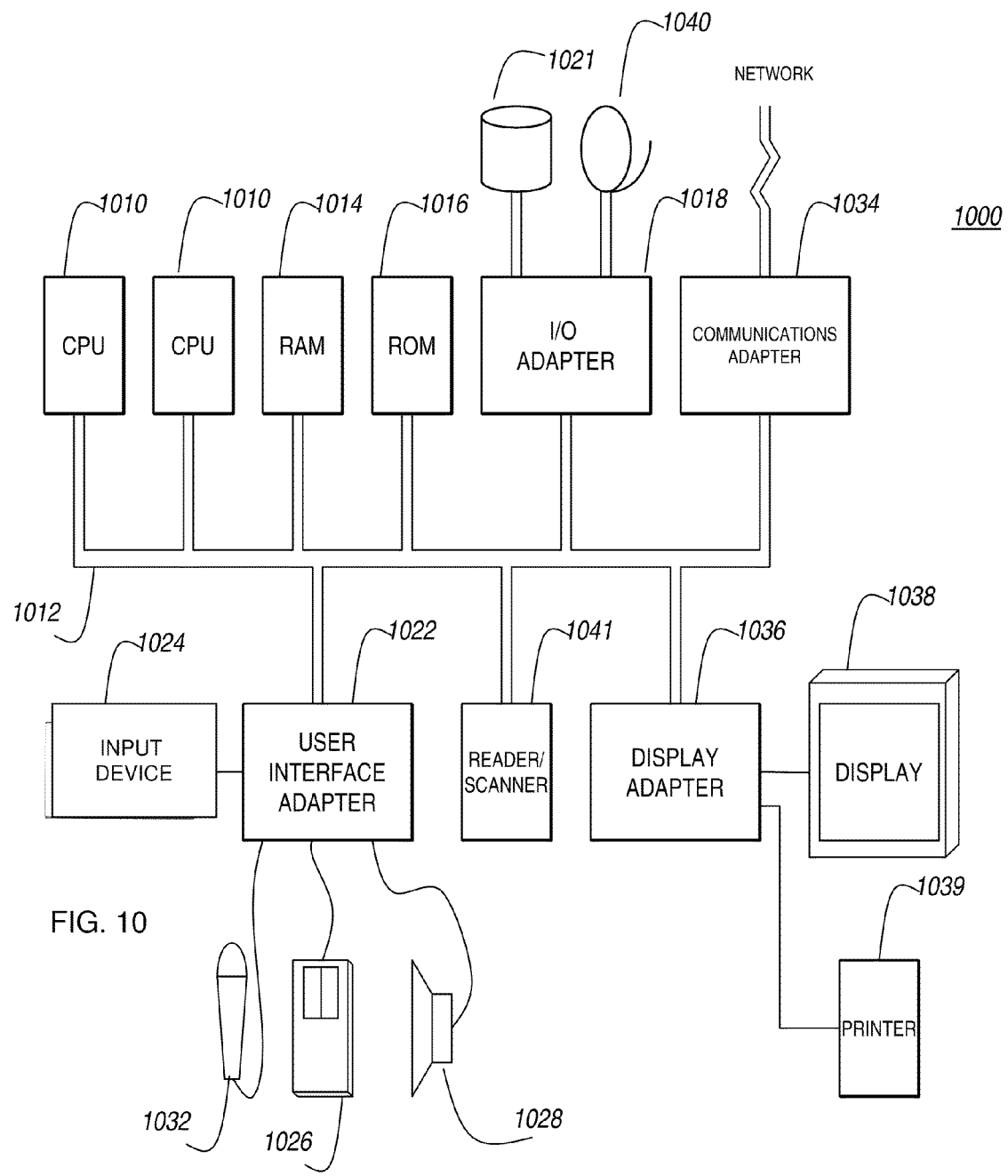
FIG. 10 illustrates a typical hardware configuration 1000 that may be used to implement the tool and method of the present invention (e.g., tool 200, method 600, tool 700 and method 900) in accordance with an exemplary aspect of the present invention.
Figure 11:
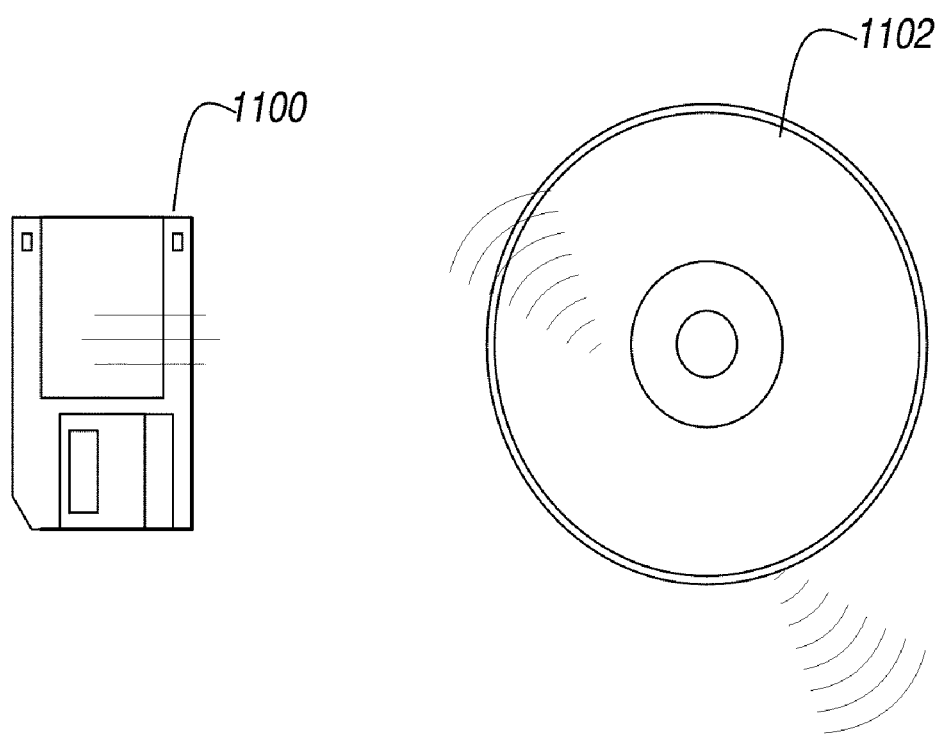
FIG. 11 illustrates a magnetic data storage diskette 1100 and compact disc (CD) 1102 that may be used to store instructions for performing the inventive method of the present invention (e.g., method 600 and method 900), in accordance with an exemplary aspect of the present invention.

Referring now to FIG. 10, system 1000 illustrates a typical hardware configuration which may be used for implementing the method 600 of generating an event map and method 900 of annotating an event map. The configuration has preferably at least one processor or central processing unit (CPU) 1011. The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1028, speaker 1028, microphone 1032, pointing stick 1027 and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039. Further, an automated reader/scanner 1041 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1011 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 1011 and hardware above, to perform the method of the invention.

This signal-bearing media may include, for example, a RAM contained within the CPU 1011, as represented by the fast-access storage for example. Alternatively, the instructions may be contained in another signal-bearing media, such as a magnetic data storage diskette 1100 or compact disc 1102 (FIG. 11), directly or indirectly accessible by the CPU 1011.

Whether contained in the computer server/CPU 1011, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as C, C++, etc.

With its unique and novel features, the present invention provides a tool and method for mapping an event which is more efficient and convenient than conventional systems and methods, and an efficient and convenient tool and method of annotating an event map which may include annotating an event map based on a user input either individually or collaboratively and searching the annotated event map.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A tool for mapping an event, comprising:
   a map generator for generating an event map depicting a schedule of activities for an event including plural sessions, the event map comprising an event map substrate and an application pinned to a feature of the event map substrate;
   a view generator for generating a zoomable and pannable view of the schedule of activities depicted by said event map, the zoomable and pannable view comprising a link associated with the feature in the event map, and the view generator opening the application in response to a user selection of the link; and
   a display device for displaying said zoomable and pannable view of the schedule of activities depicted by said event map,
   wherein the zoomable and pannable view comprises a zoomable, pannable and mashable view of the schedule of activities depicted by the event map.

2. The tool of claim 1, further comprising:
   a customizing unit for customizing said view of the schedule of activities depicted by said event map based on one of user data pertaining to a user, attendance data pertaining to an attendee of said event, data pertaining to said event, and data pertaining to a portion of said event.

3. The tool of claim 2, wherein said customizing said view of the schedule of activities depicted by said event map comprises customizing said view before said event, such that said customized view comprises an identifier for identifying at least one of:
   a session that has been marked as being of interest;
   a conflict among plural sessions that have been marked as being of interest;
   a location in a planogram of a session that has been marked as being of interest; and
   a location in a planogram of a structure housing an attendee of said event.

4. The tool of claim 2, wherein said customizing said view of the schedule of activities depicted by said event map comprises customizing said view during said event, such that said customized view comprises an up-to-date view of the schedule of activities depicted by said event map.

5. The tool of claim 2, wherein said customizing unit customizes said view of the schedule of activities depicted by said event map by at least one of:
   selecting a content of said event map by one of selecting or deselecting a portion of said event;
   selecting a content of said event map by filtering said event map by one of time, type, location, rating, user, attendee and activity; and
   inserting into said event map data obtained from a source other than said tool.

6. The tool of claim 1, wherein said zoomable and pannable view is zoomable by using one of a literal zoom in which a content of the schedule of activities depicted by said event map is magnified and displayed with a higher drawing resolution, and a semantic zoom in which a different amount of information is displayed when a user zooms in on the schedule of activities depicted by said event map.

7. The tool of claim 1, wherein said event map is represented in a structured data format.

8. The tool of claim 7, wherein said view comprises a hyperlink related to a feature in said event map, and said view generator generates said view in response to a user selection of said hyperlink.

9. The tool of claim 8, wherein said feature in said view of said event map comprises one of an event location, an event time, an event session, media associated with an event session, an event activity, event information and an event presentation.

10. The tool of claim 9, wherein said event comprises at least one of a conference, a trade show, convention, social gathering, and a sporting event.

11. The tool of claim 10, wherein said view of the schedule of activities depicted by said event map comprises at least one of a hierarchical view, a timeline view, a planogram view and a list view of said event map.

12. The tool of claim 11, wherein said event comprises plural events at plural locations, and said event map comprises an event map for said plural events.

13. The tool of claim 1, wherein the zoomable, pannable and mashable view of the schedule of activities depicted by said event map comprises a mashup substrate for combining text data and media data into an integrated display.

14. The tool of claim 1, wherein the view generator generates a display comprising:
   a button for selecting the zoomable and pannable view of the schedule of activities depicted by the event map from a plurality of zoomable and pannable views; and
   a viewing panel in which the selected zoomable and pannable view of the schedule of activities depicted by the event map is displayed.

15. The tool of claim 14, wherein the zoomable and pannable view of the schedule of activities depicted by the event map is zoomable and pannable by selecting a feature of the zoomable and pannable view as the zoomable and pannable view is displayed in the viewing panel.

16. A method of mapping an event, comprising:
   generating an event map depicting a schedule of activities for an event including plural sessions, the event map comprising an event map substrate and an application pinned to a feature of the event map substrate;

generating a zoomable and pannable view of the schedule of activities depicted by said event map, the zoomable and pannable view comprising a link associated with the feature in the event map, and the view generator opening the application in response to a user selection of the link; and displaying said zoomable and pannable view of the schedule of activities depicted by said event map, wherein the zoomable and pannable view comprises a zoomable, pannable and mashable view of the schedule of activities depicted by the event map.

17. The method of claim 16, wherein the event map supports multiple visualizations of the event map, including a hierarchical view, a timeline view, a planogram view and a list view of said event map.

18. The method of claim 17, wherein the timeline view organizes plural elements of the event hierarchically such that an order of a hierarchy of the plural elements is alterable according to plural criteria comprising a track of said event, a location of said event, a session being attended by a user, and a session being attended by a person other than said user.

19. The method of claim 16, further comprising:
customizing said view of the schedule of activities depicted by said event map based on one of user data pertaining to a user, attendance data pertaining to an attendee of said event, data pertaining to said event, and data pertaining to a portion of said event.

20. The method of claim 19, wherein said customizing said view of the schedule of activities depicted by said event map comprises customizing said view, such that said customized view comprises an identifier for identifying at least one of:
a session that has been marked as being of interest;
a conflict among plural sessions that have been marked as being of interest;
a location in a planogram of a session that has been marked as being of interest; and
a location in a planogram of a structure housing an attendee of said event.

21. The method of claim 20, wherein said identifier comprises at least one of a predetermined color and a predetermined design.

22. The method of claim 19, wherein said view comprises a hyperlink related to a feature in said event map, and said view is generated in response to a user selection of said hyperlink.

23. The method of claim 22, wherein said feature in said view of the schedule of activities depicted by said event map comprises one of an event location, an event time, an event session, media associated with an event session, an event activity, event information and an event presentation.

24. The method of claim 19, wherein said zoomable and pannable view comprises one of a branch view, a timeline view and a planogram view of said customized view of the schedule of activities depicted by the event map.

25. The method of claim 19, wherein said customizing said view of the schedule of activities depicted by said event map comprises customizing said view during said event, such that said customized view comprises an up-to-date view of the schedule of activities depicted by said event map.

26. A tool for mapping an event, comprising:
a map generator for generating an event map depicting a schedule of activities for an event including plural sessions, the event map comprising an event map substrate and an application pinned to a feature of the event map substrate;

a view generator for generating a zoomable and pannable view of the schedule of activities depicted by said event map, the zoomable and pannable view comprising a link associated with the feature in the event map, and the view generator opening the application in response to a user selection of the link;

a display device for displaying said zoomable and pannable view of the schedule of activities depicted by said event map; and a customizing unit for customizing said view of the schedule of activities depicted by said event map based on one of user data pertaining to a user, attendance data pertaining to an attendee of said event, data pertaining to said event, and data pertaining to a portion of said event, wherein said customizing said view of the schedule of activities depicted by said event map comprises customizing said view before said event, such that said customized view comprises an identifier for identifying at least one of:
a session that has been marked as being of interest;
a conflict among plural sessions that have been marked as being of interest;
a location in a planogram of a session that has been marked as being of interest; and
a location in a planogram of a structure housing an attendee of said event, and wherein said zoomable and pannable view is zoomable by using one of a literal zoom in which a content of said event map is magnified and displayed with a higher drawing resolution, and a semantic zoom in which a different amount of information is displayed when a user zooms in on said event map, and wherein the zoomable and pannable view comprises a zoomable, pannable and mashable view of the schedule of activities depicted by the event map.

27. A system for mapping an event comprising:
an event server for storing event data;
a processing device for inputting user data, said processing device being connected to said event server via a network;
a tool for mapping an event, said tool being connected to said event server and said processing device via said network, and comprising:
a map generator for generating an event map depicting a schedule of activities for an event including plural sessions, the event map comprising an event map substrate and an application pinned to a feature of the event map substrate;
a view generator for generating a zoomable and pannable view of the schedule of activities depicted by said event map, the zoomable and pannable view comprising a link associated with the feature in the event map, and the view generator opening the application in response to a user selection of the link; and
a display device for displaying said zoomable and pannable view of the schedule of activities depicted by said event map,
wherein the zoomable and pannable view comprises a zoomable, pannable and mashable view of the schedule of activities depicted by the event map.

28. A programmable storage medium tangibly embodying a program of machine-readable instructions executable by a digital processing apparatus to perform a method of mapping an event, said method comprising:

generating an event map depicting a schedule of activities for an event including plural sessions, the event map comprising an event map substrate and an application pinned to a feature of the event map substrate;

generating a zoomable and pannable view of the schedule of activities depicted by said event map, the zoomable and pannable view comprising a link associated with the feature in the event map, and the view generator opening the application in response to a user selection of the link; and displaying said zoomable and pannable view of the schedule of activities depicted by said event map, wherein the zoomable and pannable view comprises a zoomable, pannable and mashable view of the schedule of activities depicted by the event map.

* * * * *